United States Patent
Huynh

(10) Patent No.: US 12,103,122 B2
(45) Date of Patent: Oct. 1, 2024

(54) CONTACT CHIP REGENERATING DEVICE

(71) Applicant: TIPMAN CO., LTD., Aichi (JP)

(72) Inventor: Huu Thinh Huynh, Aichi (JP)

(73) Assignee: TIPMAN CO., LTD., Aichi (JP)

( * ) Notice: Subject to any disclaimer, the term of this patent is extended or adjusted under 35 U.S.C. 154(b) by 398 days.

(21) Appl. No.: 17/335,824

(22) Filed: Jun. 1, 2021

(65) Prior Publication Data

US 2021/0379687 A1   Dec. 9, 2021

Related U.S. Application Data

(63) Continuation of application No. PCT/JP2020/009285, filed on Mar. 5, 2020.

(30) Foreign Application Priority Data

Mar. 7, 2019   (JP) ................................. 2019-042021

(51) Int. Cl.
*B21K 21/12*   (2006.01)
*B21J 5/06*    (2006.01)
(Continued)

(52) U.S. Cl.
CPC ...... *B23K 9/32* (2013.01); *B21J 5/06* (2013.01); *B23K 9/26* (2013.01)

(58) Field of Classification Search
CPC .. B23K 11/3072; B23K 11/3063; B23K 9/32; B23K 9/26; B23Q 3/15506;
(Continued)

(56) References Cited

U.S. PATENT DOCUMENTS 6,093,907 A * 7/2000 Hidaka ................. B23K 9/122
                                                219/137.61
2014/0175076 A1* 6/2014 Wang ..................... B23K 9/042
                                                219/138

(Continued)

FOREIGN PATENT DOCUMENTS

CN    1047465 A    5/1990
CN    1100019 A    3/1995
(Continued)

OTHER PUBLICATIONS

Chinese Office Action dated Mar. 25, 2022 from corresponding Chinese Patent Application No. 202080006631.8, 10 pages.
(Continued)

*Primary Examiner* — Helena Kosanovic
*Assistant Examiner* — Tiffany T Tran
(74) *Attorney, Agent, or Firm* — Ruggiero McAllister & McMahon LLC

(57) ABSTRACT

A device is provided with a first die, a second die and a pressing machine. The second die is provided with a plastic processing hole where a core metal is disposed on a hole center line. On the inner peripheral surface of the plastic processing hole, three projecting portions are provided at regular intervals in the circumferential direction of the hole center line. By the approach of the first and second dies to each other, the core metal is inserted into a guide hole of a contact tip, and the projecting portions plastically deform the head end side of the contact tip by pressing it until it is in contact with the core metal.

7 Claims, 39 Drawing Sheets

(51) Int. Cl.
*B23K 9/32* (2006.01)
*B23K 9/26* (2006.01)

(58) Field of Classification Search
CPC .... Y10T 483/17; Y10T 483/1882; B21J 5/06; B21J 5/12; B21K 21/12
See application file for complete search history.

(56) References Cited

U.S. PATENT DOCUMENTS

2017/0232546 A1* 8/2017 Marakkala Manage ............... B23K 11/3072 219/86.8
2017/0291250 A1* 10/2017 Huynh ............... B23K 11/3072

FOREIGN PATENT DOCUMENTS

| | | | |
|---|---|---|---|
| CN | 104959715 A | | 10/2015 |
| CN | 107107245 A | | 8/2017 |
| EP | 0 399 334 A2 | | 11/1990 |
| EP | 0 621 102 A1 | | 10/1994 |
| JP | 2000-190078 A | | 7/2000 |
| JP | 2000351073 A | | 12/2000 |
| JP | 2001-246472 A | | 9/2001 |
| JP | 2001-300732 A | | 10/2001 |
| JP | 2004209529 A | * | 7/2004 |
| JP | 2006167733 A | * | 6/2006 |
| JP | 2009-66604 A | | 4/2009 |
| JP | 2015-205311 A | | 11/2015 |
| WO | 2017/46990 A1 | | 3/2017 |

OTHER PUBLICATIONS

Extended European Search Report dated Dec. 7, 2021 from corresponding European Patent Application No. 20766002.8, 7 pages.
International Search Report dated Apr. 14, 2020 from corresponding International Patent Application No. PCT/JP2020/009285, 6 pages.
Written Opinion dated Apr. 14, 2020 from corresponding International Patent Application No. PCT/JP2020/009285, 3 pages.

* cited by examiner

CONTACT CHIP REGENERATING DEVICE

CROSS-REFERENCE TO RELATED APPLICATION

This application is a continuation of International Application No. PCT/JP2020/009285 filed on Mar. 5, 2020, which is incorporated herein by reference in its entirety.

BACKGROUND OF THE DISCLOSURE

1. Field of the Disclosure

The present invention relates to a contact tip reforming device and a contact tip reforming method for reforming a contact tip in a state where the head end side inner peripheral surface of a guide hole that guides the welding wire is worn after arc welding is repetitively performed.

2. Description of the Related Art

Conventionally, at the time of arc welding, a welding torch for arc welding is used, and to the welding torch, a copper contact tip is attached that supplies welding current to the object to be welded through the welding wire. The contact tip has an elongate bar shape, and on the center line thereof, a guide hole that guides the welding wire at the time of welding is formed so as to pass through.

When arc welding is repetitively performed, the head end side inner peripheral surface of the guide hole of the contact tip is worn by the friction with the welding wire, so that the diameter of the guide hole on the head end side of the contact tip is increased. Then, the position of the welding wire in the guide hole readily changes at the time of arc welding and this destabilizes the state of contact between the welding wire and the inner peripheral surface of the guide hole, so that the welding current flowing from the contact tip to the object to be welded through the welding wire becomes unstable and this degrades welding quality. Consequently, it is common practice to periodically detach the contact tip having repetitively performed arc welding from the welding torch and replace it, which increases the component cost.

To cope with this, for example, Patent Literature 1 discloses a contact tip reforming device that reforms a used contact tip. The contact tip reforming device has a cylindrical collet holder, and the outer peripheral surface of the collet holder is a tapered surface that decreases in diameter gently and linearly toward the head end. On the collet holder, a plurality of slits extending along the cylinder center line of the collet holder and opened to the head end opening thereof are formed at regular intervals in the circumferential direction of the cylinder center line, and the divisional parts separated by the slits bend in a direction intersecting the cylinder center line. Moreover, the contact tip reforming device has a rod head having an insertion hole in which the collet holder can be fitted by insertion from the head end side. The inner peripheral surface of the insertion hole has a shape conforming to the outer peripheral surface of the collet holder, and is a tapered surface that decreases in diameter gently and linearly with increasing distance from the collet holder. Then, under a condition where the used contact tip where a core metal being hexagonal in cross section is inserted in the guide hole is fitted by insertion from the base end side opening of the collet holder, the collet holder is pushed into the fitting hole of the rod head so that the outer peripheral surface of the collet holder is in sliding contact with the inner peripheral surface of the fitting hole, whereby the divisional parts separated by the slits of the collet holder are moved toward the cylinder center line and the head end side of the contact tip is pressed toward the cylinder center line until it is in contact with the core metal so as to be plastically deformed. By doing this, not only the shape of the guide hole on the head end side of the contact tip is made small to reform the contact tip but also the cross-sectional shape of the guide hole is hexagonal, so that the welding wire is in contact with the inner peripheral surface of the guide hole at two points and this stabilizes welding quality when arc welding is performed by using the reformed contact tip.

CITATION LIST

[Patent Literature 1] Japanese Laid-Open Patent Publication No. 2000-190078

SUMMARY

However, in the contact tip reforming device of Patent Literature 1, since the adjoining divisional parts of the collet holder press the head end portion of the contact chip while approaching each other so that the slits are eliminated at the time of reforming, there is hardly any escape space for the plastically deformed part of the contact tip. Consequently, a large force is required when the collet holder is pushed into the fitting hole of the rod head, so that it is necessary to set the capability of the device high and this can increase the cost.

Moreover, since the cross section of the guide hole is made hexagonal by making the inner peripheral surface of the guide hole conform to the outer peripheral surface of the core metal when the head end side of the contact tip is plastically deformed, the outer peripheral surface of the core metal is in intimate contact with the inner peripheral surface of the guide hole when the contact tip is plastically deformed, so that there is a possibility that the core metal cannot be pulled out from the guide hole to stop the device. Further, since the core metal is hexagonal in cross section, when contact tip reforming is repetitively performed, the angular part of the outer peripheral surface is deformed due to wear, so that the contact tip gradually ceases to be reformed so that the cross section of the guide hole is hexagonal. Consequently, it is necessary to change the core metal before the angular part of the core metal is deformed and this can shorten the maintenance cycle.

The present invention is made in view of such points, and an object thereof is to provide a low-cost contact tip reforming device and contact tip reforming method capable of reducing stopping of the operation of the device and capable of prolonging the maintenance cycle.

To attain the above-mentioned object, in the present invention, portions that plastically deform the contact tip and portions that are not in contact with the contact tip are alternately provided more than one in number in the circumferential direction of the central axis of the contact tip.

Specifically, in a contact tip reforming device that reforms a contact tip for arc welding where the head end side inner peripheral surface of the guide hole that guides the welding wire is worn because of use, the following solution is adopted:

According to a first aspect of the invention, the following are provided: a first die to which the contact tip is fixable; a second die disposed so as to face a head end side of the contact tip fixed to the first die; and a pressing machine that causes the first and second dies to approach each other and separate from each other, the second die is provided with: a plastic processing hole formed in a position corresponding to the contact tip fixed to the first die and gradually decreases in diameter with increasing distance from the first die; and a core metal disposed on a hole center line of the plastic processing hole, having a circular shape a cross section of which conforms to a cross section of the guide hole, and inserted into the guide hole of the contact tip fixed to the second die with the first and second dies approaching each other; on an inner peripheral surface of the plastic processing hole, the following are provided: at least three projecting portions projecting inward of the plastic processing hole, extending along the hole center line and situated at regular intervals in a circumferential direction of the hole center line; and recessed surface portions that are as many as the projecting portions, are each formed of an inner peripheral surface between the adjoining two projecting portions of the plastic processing hole and are situated at regular intervals in the circumferential direction of the hole center line, and the projecting portions are structured so as to plastically deform the head end side of the contact tip by, when the contact tip is inserted into the plastic processing hole by the approach of the first and second dies to each other by the processing machine, pressing the head end side of the contact tip toward the hole center line until it is in contact with the core metal while being in sliding contact with a head end side outer peripheral surface of the contact tip under a condition where the contact tip is out of contact with the recessed surface portions.

According to a second aspect of the invention, in the first aspect of the invention, on a contact tip insertion opening side of the plastic processing hole on each of the projecting portions, a guide surface is formed that inclines so that the distance from the hole center line gradually increases toward a circumferential edge of the contact tip insertion opening.

According to a third aspect of the invention, in the first or second aspect of the invention, the projecting portions are provided three in number in the circumferential direction of the hole center line.

According to a fourth aspect of the invention, in any one of the first to third aspects of the invention, the following are provided: tip supply means for supplying the contact tip to a first region with a center line thereof being oriented vertically; tip holding means capable of holding the contact tip; horizontally moving means for horizontally moving the tip holding means between the first region and a second region that is set on a side of the first region and between the first and second dies; and moving upward and downward means for moving the tip holding means upward and downward in the second region.

According to a fifth aspect of the invention, in the fourth aspect of the invention, the tip holding means is provided with: a first rotating body having a holding work space where a rotation axis is set at the center and having a plurality of fitting portions at regular intervals around the rotation axis; a second rotating body structured so as to be rotatable about the rotation axis relatively to the first rotating body; rotation driving means for rotating at least one of the first and second rotating bodies; and holding bodies disposed in positions corresponding to the fitting portions, respectively, supported by the second rotating body so as to be rotatable about the rotating shaft extending in the same direction as the rotation axis, each having a pair of claw portions formed at a head end so as to be separated in a circumferential direction with the rotating shaft as the center, and base ends of which are loosely fitted in the corresponding fitting portions, when the first and second rotating bodies rotate from a reference position to one side relatively to each other by a driving operation of the rotation driving means, the holding bodies are each rotated to the one side by pressing of the base portion to the one side by the fitting portion and one of the claw portions moves forward to the holding work space so as to be contactable with the contact tip that is set in the holding work space, thereby holding the contact tip, and when the first and second rotating bodies rotate from the reference position to the other side relatively to each other, the holding bodies are each rotated to the other side by pressing of the base portion to the other side by the fitting portion and the other of the claw portions moves forward to the holding work space so as to be contactable with the contact tip that is set in the holding work space, thereby holding the contact tip.

According to a sixth aspect of the invention, in the fifth aspect of the invention, the first die has a female screw portion corresponding to a male screw portion formed on a base end side of the contact tip, the contact tip is rotated to one side about a center line thereof to thereby screw the male screw portion into the female screw portion to fix the contact tip to the first die, and the contact tip is rotated to the other side about the center line thereof to thereby screw the male screw portion out from the female screw portion to detach the contact tip from the first die.

According to a seventh aspect of the invention, in any one of the first to sixth aspects of the invention, the tip supply means is provided with: an inclined surface portion that guides the contact tip obliquely downward under its own weight in a state where the center line thereof extends obliquely downward; a guide hole portion provided on a side on a downstream side of the inclined surface portion, having at an upper end an upper end opening whose dimension in an extension direction of the inclined surface portion corresponds to a dimension in a length direction of a body portion of the contact tip excluding the male screw portion, and having at a lower end an opening of a dimension corresponding to a width dimension of the contact tip; and a stopper portion provided at a downstream end of the inclined surface, having a shape extending in a horizontal direction orthogonal to the extension direction of the inclined surface portion and toward the guide hole portion such that the extension side thereof is a position continuous with a lower part of a lower edge portion of the upper end opening of the guide hole portion, and being set in a shape that is in contact with the head end of the contact tip when the contact tip is guided by the inclined surface portion so that the head end side thereof faces downward and is in contact with the body portion without being in contact with the male screw portion when the contact tip is guided by the inclined surface portion so that the base end side thereof faces downward.

Moreover, the present invention is also for a contact tip reforming method for reforming a contact tip for arc welding where a head end side inner peripheral surface of a guide hole that guides a welding wire is worn because of use, and the following solution is adopted:

According to an eighth aspect of the invention, the following are prepared: a first die to which the contact tip is fixable; and a second die where at least three projecting portions extending along a hole center line are provided at regular intervals in a circumferential direction of the hole center line, and having a plastic processing hole formed of recessed surface portions that are as many as the projecting portions and are each formed of an inner peripheral surface between the adjoining two projecting portions, the first and second dies are caused to approach each other, a core metal having a circular shape a cross section of which conforms to a cross section of the guide hole is inserted into the guide hole of the contact tip fixed to the first die, the contact tip is inserted into the plastic processing hole, then, the first and second dies are caused to further approach each other, and by making the projecting portions in sliding contact with an outer peripheral surface of the contact tip without the recessed surface portions being in contact with the outer peripheral surface of the contact tip, the projecting portions plastically deform a head end side of the contact tip by pressing it toward the hole center line until it is in contact with the core metal, thereby reforming the contact tip.

According to the first and eighth aspects of the invention, since an area corresponding to each projecting portion on the head end side of the contact tip is plastically deformed toward the guide hole, the hole shape of the guide hole on the contact tip head end side becomes smaller, so that the contact tip can be reformed. Moreover, while the area corresponding to each projecting portion on the head end side of the contact tip is plastically deformed toward the guide hole, an area corresponding to each recessed surface portion on the head end side of the contact tip remains in each recessed surface portion without plastically deformed, so that the guide hole on the head end side of the contact tip has a polygonal cross-sectional shape where the vertices are situated in the areas corresponding to the recessed surface portions. Consequently, when arc welding is performed by using the reformed contact tip, the welding wire is in contact with the inner peripheral surface of the guide hole at two points, so that welding quality can be stabilized. Moreover, since the contact tip is out of contact with the recessed surface portions when the contact tip is plastically deformed by the projecting portions, the absence of escape space for the plastically deformed part of the contact tip as in Patent Literature 1 can be avoided. Consequently, since the force for plastically deforming the contact tip is reduced, it is unnecessary to make the capability of the device higher than necessary, so that a low-cost can be achieved. Further, since the parts corresponding to the projecting portions of the contact tip are in line contact with the outer peripheral surface of the core metal when the head end side of the contact tip is plastically deformed, the area of contact between the inner peripheral surface of the guide hole after plastic deformation and the outer peripheral surface of the core metal is small compared with the structure as in Patent Literature 1, so that the device can be prevented from being stopped by the core metal being unable to be pulled out from the guide hole. In addition, since the core metal is circular in cross section, it never occurs that the angular part of the outer peripheral surface is deformed due to wear when reforming of the contact tip is repetitively performed as in Patent Literature 1, so that the maintenance cycle can be prolonged.

According to the second aspect of the invention, when the first die and the second die are caused to approach each other, the contact tip is smoothly guided into the plastic processing hole with the central axis of the contact tip being made to coincide with the hole center line of the plastic processing hole by the guide surfaces, so that the cross-sectional shapes of the guide holes of the contact tips to be reformed can be made the same.

According to the third aspect of the invention, the cross-sectional area of the guide hole on the head end side of the reformed contact tip is large compared with when four or more projecting portions are provided in the circumferential direction of the hole center line. Consequently, powder such as spatter, fume or copper plating is not readily accumulated in the guide hole when arc welding is performed, so that stopping of supply of the welding wire can be reduced.

According to the fourth aspect of the invention, the contact tip supplied to the first region by the tip supply means is held by the tip holding means with the center line thereof extending vertically, and is conveyed to the second region by the horizontally moving means under that condition. Since the contact tip conveyed to the second region is conveyable to the first die by the moving upward and downward means in the second region, when the conveyed contact tip is fixed to the first die, the contact tip is in a reform standby state. As described above, the unreformed contact tip can be efficiently brought into the reform standby state. Moreover, when the tip holding means is moved to the first die to which the reformed contact tip is fixed, by the moving upward and downward means and the horizontally moving means and then, the tip holding means is retreated from the first and second dies by the moving upward and downward means and the horizontally moving means, the reformed contact tip can be easily taken out from the second region. As described above, the unreformed and reformed contact tips can be efficiently conveyed to and from the second region where the contact tips are reformed.

According to the fifth aspect of the invention, when the contact tip is set in the holding work space with the first and second rotating bodies being in the reference position and then, the first and second rotating bodies are rotated to one side relatively to each other, one claw portion of each holding body moves forward to the holding work space to hold the contact tip and cause the first and second rotating bodies to integrally rotate to one side about the center line thereof, whereas when the contact tip is set in the holding work space with the first and second rotating bodies being in the reference position and then, the first and second rotating bodies are rotated to the other side relatively to each other, the other claw portion of each holding body moves forward to the holding work space to hold the contact tip and cause the first and second rotating bodies to integrally rotate to the other side about the center line thereof. As described above, the contact tip can be held irrespective of the direction in which the first and second rotating bodies are rotated relatively to each other, and the contact tip can be rotated about the center line thereof in a state of being held.

According to the sixth aspect of the invention, when the contact tip is caused to approach the first die by moving the moving upward and downward means upward and downward while the first and second rotating bodies are rotated from the reference position to one side relatively to each other to hold the contact tip by one claw portion of each holding body and rotate it to one side about the center line thereof, the male screw portion of the contact tip screws into the female screw portion of the first die, so that the contact tip is fixed to the first die. When the first and second rotating bodies are rotated to the other side relatively to each other after the contact tip is fixed to the first die, one claw portion of each holding body retreats from the holding work space, so that the tip holding means releases the contact tip. On the other hand, when the contact tip fixed to the first die is separated from the first die by moving the moving upward and downward means upward and downward while the first and second rotating bodies are rotated from the reference position to the other side relatively to each other to hold the contact tip by the other claw portion of each holding body and rotate it to the other side about the center line thereof, the male screw portion of the contact tip screws out from the female screw portion of the first die, so that the contact tip is detached from the first die. As described above, the rotations of the first and second rotating bodies enable the hold and release of the contact tip and further, fixing and detachment to and from the first die, so that the procedures before and after reforming of the contact tip can be efficiently performed.

According to the seventh aspect of the invention, when the inclined surface portion guides the contact tip with the head end side thereof facing obliquely downward, the head end of the contact tip is in contact with the stopper portion. When the contact tip is slid in a direction intersecting the center line thereof under this condition, although the contact tip drops into the guide hole portion, since the head end side of the contact tip starts to drop into the guide hole portion with the male screw portion running on the upper edge portion of the upper end opening of the guide hole portion, the contact tip drops while the head end side thereof is rotating downward about the male screw portion. Consequently, when passing the lower end opening of the guide hole portion, the contact tip always passes with the head end side facing downward and the center line extending in the vertical direction. On the other hand, when the inclined surface portion guides the contact tip with the male screw portion side thereof facing obliquely downward, the male screw portion of the contact tip runs on the stopper portion and the body portion of the contact tip excluding the male screw portion is in contact with the stopper portion. When the contact tip is slid in a direction intersecting the direction of the center line thereof under this condition, although the contact tip drops into the guide hole portion, since the head end side of the contact tip starts to drop into the guide hole portion with the male screw portion running on the stopper portion, the contact tip drops while the head end side thereof is rotating downward about the male screw portion. Consequently, when passing the lower end opening of the guide hole portion, the contact tip always passes with the head end side facing downward and the center line extending in the vertical direction. As described above, even when the orientations of the head ends of the contact tips supplied to the inclined surface portion are different, the orientations of the head ends of the contact tips supplied to the first region can be made always the same.

DESCRIPTION OF EMBODIMENTS

Hereinafter, embodiments of the present invention will be described in detail based on the drawings. The following description of preferred embodiments is essentially nothing but illustrative.

First Embodiment of the Invention

Figure 1:
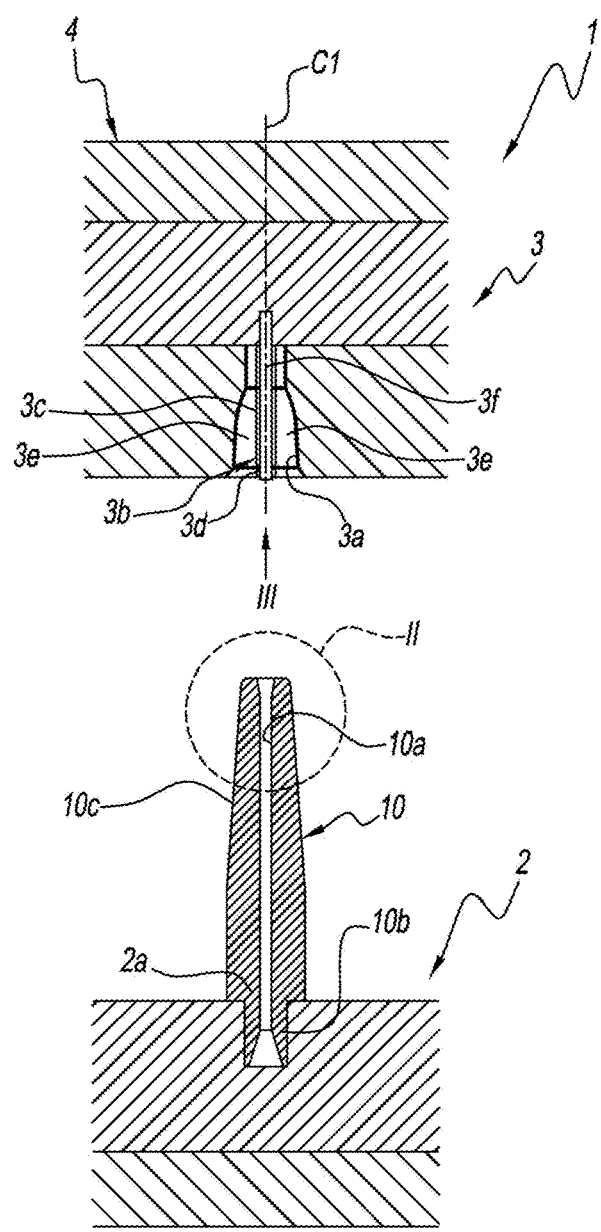
FIG. 1 is a schematic cross-sectional view of a contact tip reforming device according to a first embodiment of the present invention.

FIG. 1 is a schematic cross-sectional view of a contact tip reforming device 1 according to a first embodiment of the present invention. The contact tip reforming device 1 reforms, after use, a copper contact tip 10 used in a state of being attached to a welding torch (not shown) for arc welding, and is provided with: a first die 2 to which the contact tip 10 can be fixed; a second die 3 disposed above the first die so as to face it; and a pressing machine 4 causing the first die 2 and the second die 3 to approach each other and separate from each other by moving the second die 3 upward and downward with respect to the first die 2.

The contact tip 10 has an elongate bar shape, and is provided with a body portion 10c the outer peripheral surface of which gently and linearly decreases in diameter from the middle part toward the head end.

On the base end side of the contact tip 10, a substantially cylindrical male screw portion 10b is projected, and on the center line of the contact tip 10, a guide hole 10a being circular in cross section and guiding a welding wire 11 (see FIG. 10) is formed so as to pass through.

Figure 2:
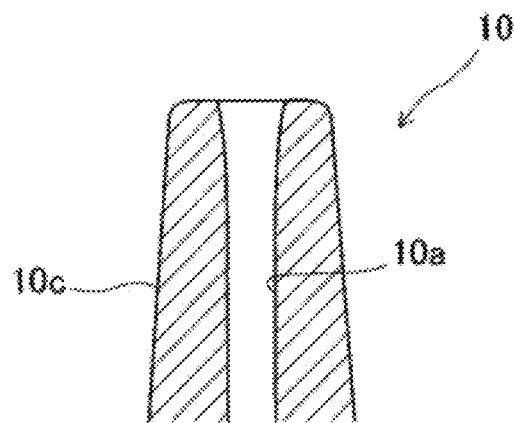
FIG. 2 is an enlarged view of part II of FIG. 1.

When arc welding is repeated by a non-illustrated welding torch, the inner peripheral surface of the guide hole 10a is worn due to friction caused when the welding wire 11 is guided, and as shown in FIG. 2, the head end side, of the contact tip 10, of the guide hole 10a is deformed into a shape that gradually increases in diameter toward the head end of the contact tip 10.

On the upper surface of the first die 2, as shown in FIG. 1, a female screw portion 2a having a concave shape opened upward is formed, and into the female screw portion 2a, the male screw portion 10b of the contact tip 10 is screwable.

The contact tip 10 is fixed to the first die 2 in an upward facing position by screwing the male screw portion 10b into the female screw portion 2a, and the second die 3 faces the head end side of the contact tip 10 fixed to the first die 2.

In a position of the second die 3 corresponding to the contact tip 10 fixed to the first die 2, a plastic processing hole 3a opened downward is formed, and the plastic processing hole 3a has a substantially conical shape that gradually decreases in diameter with increasing distance from the first die 2.

Figure 3:
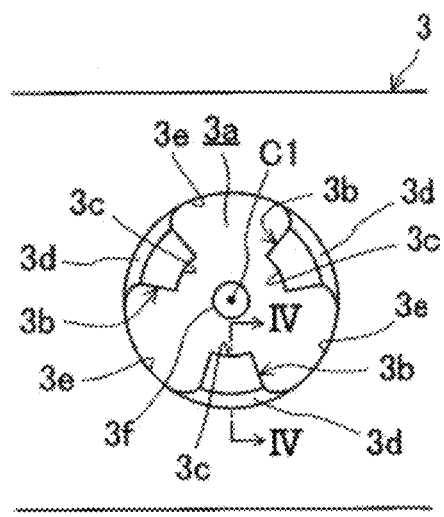
FIG. 3 is a view on arrow III of FIG. 1.

On the inner peripheral surface of the plastic processing hole 3a, as shown in FIG. 3, three projecting portions 3b projecting inward of the plastic processing hole 3a and extending along a hole center line C1 are provided at regular intervals in the circumferential direction of the hole center line C1.

The projecting end of the projecting portion 3b is a curved surface 3c gently recessed so that the distance from the hole center line C1 increases when viewed in the direction of the hole center line C1.

Figure 4:
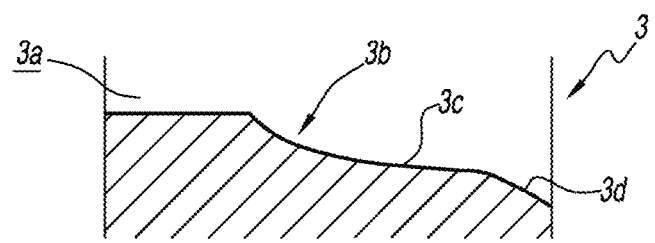
FIG. 4 is a cross-sectional view on line IV-IV of FIG. 3.

On the contact tip 10 insertion opening side of the plastic processing hole 3a on the projecting portion 3b, as shown in FIG. 4, a guide surface 3d is formed that inclines so that the distance from the hole center line C1 gradually increases toward the circumferential edge of the contact tip 10 insertion opening.

Between the adjoining two projecting portions 3b, a recessed surface portion 3e is provided that is opened to the inside of the plastic processing hole 3a and extends along the hole center line C1, and three recessed surface portions 3e which are as many as the projecting portions 3b are provided at regular intervals in the circumferential direction of the hole center line C1.

That is, the recessed surface portions 3e are each formed of the inner peripheral surface between the adjoining two projecting portions 3b of the plastic processing hole 3a.

On the hole center line C1 of the plastic processing hole 3a, a core metal 3f is disposed that has a circular shape the cross section of which conforms to the cross section of the guide hole 10a.

The core metal 3f is, as shown in FIG. 4, inserted into the guide hole 10a of the contact tip 10 fixed to the second die 3 when the first die 2 and the second die 3 are caused to approach each other by the pressing machine 4.

Figure 5:
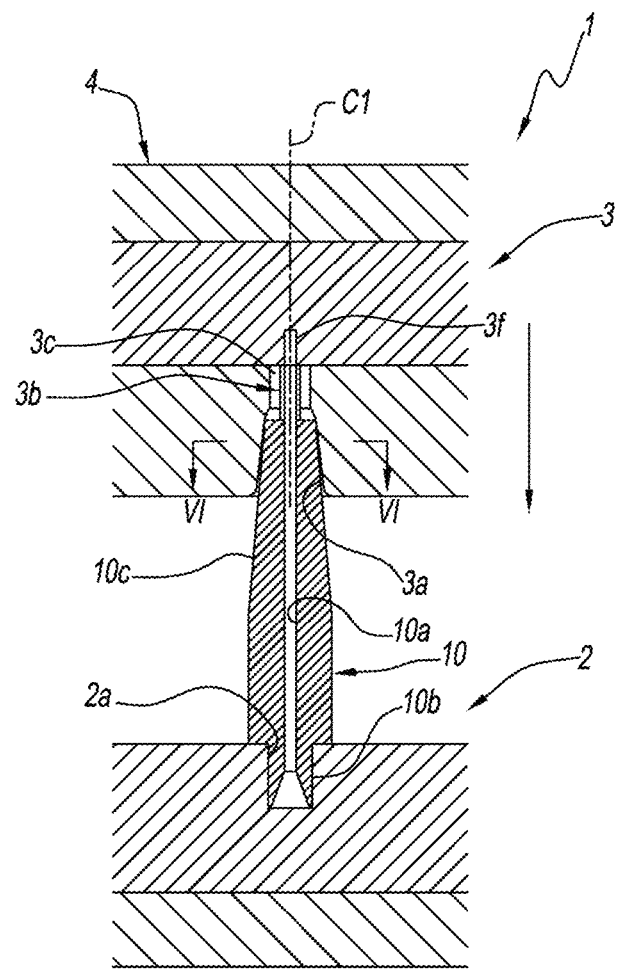
FIG. 5 is a view showing a condition in the middle of reforming of a contact tip after FIG. 1.
Figure 6:
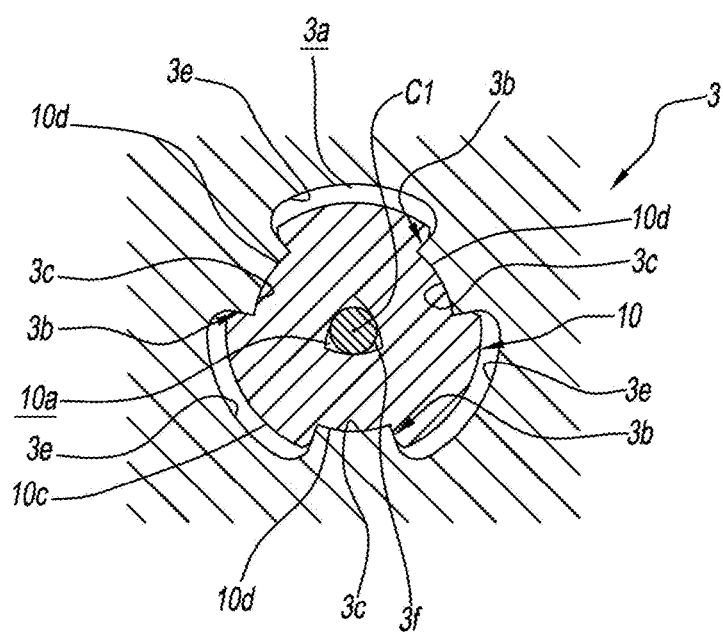
FIG. 6 is a cross-sectional view on line VI-VI of FIG. 5.
Figure 7:
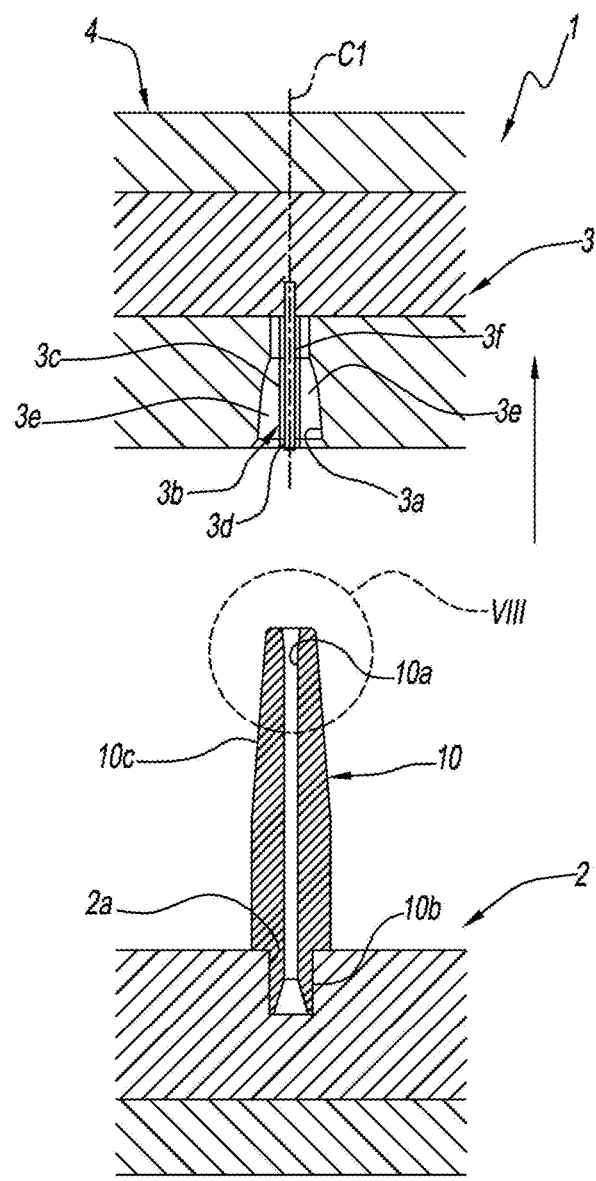
FIG. 7 is a view showing a condition immediately after a contact tip is reformed after FIG. 5.

Moreover, when the contact tip 10 is inserted into the plastic processing hole 3a by the approach of the first die 2 and the second die 3 to each other by the pressing machine 4, as shown in FIGS. 5 to 7, the projecting portions 3b plastically deform the head end side of the contact tip 10 by pressing it toward the hole center line C1 until it is in contact with the core metal 3f while being in sliding contact with the head end side outer peripheral surface of the contact tip 10 under a condition where the contact tip 10 is out of contact with the recessed surface portions 3e, whereby the contact tip 10 is reformed.

Figure 8:
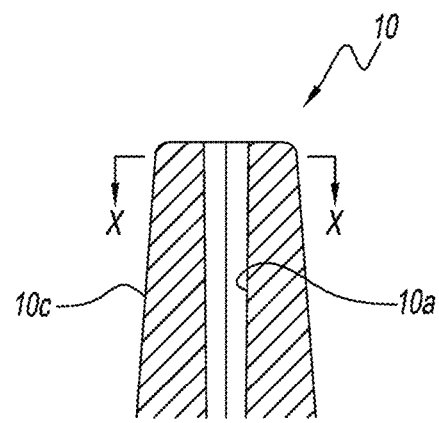
FIG. 8 is an enlarged view of part VIII of FIG. 7.
Figure 9:
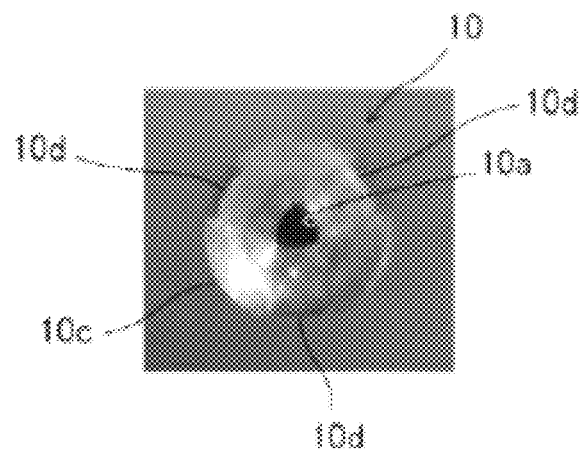
FIG. 9 is a view of a contact tip reformed by using the contact tip reforming device according to the first embodiment of the present invention which contact tip is viewed from the head end side.
Figure 10:
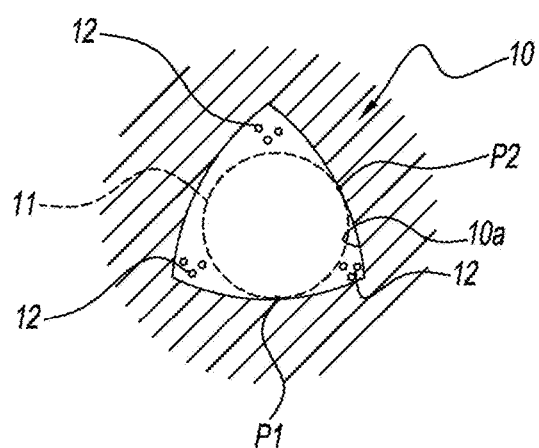
FIG. 10 is a cross-sectional view on line X-X of FIG. 8.

The guide hole 10a on the head end side of the contact tip 10 reformed by the contact tip reforming device 1 is, as shown in FIGS. 8 to 10, plastically deformed so as to be substantially triangular when viewed from the head end side of the contact tip 10. Specifically, each side of the triangular part of the guide hole 10a is gently curved so as to have a radius of curvature larger than that of the cross section of the welding wire 11. On the other hand, on the head end side outer peripheral surface of the contact tip 10, three recessed grooves 10d extending along the central axis of the contact tip 10 are formed in positions corresponding to the sides of the triangular part of the guide hole 10a. Consequently, when arc welding is performed with the reformed contact tip 10, as shown in FIG. 10, the outer peripheral surface of the welding wire 11 is in contact with the inner peripheral surface of the guide hole 10a on the head end side of the contact tip 10 at two points P1 and P2, so that current readily flows from the contact tip 10 to the welding wire 11.

Next, reforming of a used contact tip 10 by using the contact tip reforming device 1 will be described in detail.

First, as shown in FIG. 1, the male screw portion 10b of the used contact tip 10 is screwed into the female screw portion 2a of the first die 2 to fix the used contact tip 10 to the first die 2.

Then, the pressing machine 4 is operated to move the second die 3 downward. Then, the second die 3 approaches the first die 2 so that the core metal 3f is inserted into the guide hole 10a of the used contact tip 10 and the head end side of the contact tip 10 starts to enter the plastic processing hole 3a. At this time, the guide surface 3d provided on each projecting portion 3b of the plastic processing hole 3a smoothly guides the contact tip 10 into the plastic processing hole 3a so that the central axis of the contact tip 10 coincides with the hole center line C1 of the plastic processing hole 3a.

Thereafter, the second die 3 is further moved downward. Then, as shown in FIGS. 5 and 6, the projecting portions 3*b* plastically deform the head end side of the contact tip 10 by pressing it toward the hole center line C1 until it is in contact with the core metal 3*f* while being in sliding contact with the head end side outer peripheral surface of the contact tip 10. When this is done, the head end side outer peripheral surface of the contact tip 10 is not in contact with the recessed surface portions 3*e*.

Thereafter, as shown in FIG. 7, the second die 3 is moved upward so as to be separated from the first die 2. Then, as shown in FIG. 8, the hole shape of the guide hole 10*a* on the head end side of the contact tip 10 becomes smaller, so that the contact tip 10 can be reformed.

Since the reformed contact tip 10 is formed in a state where an area corresponding to each projecting portion 3*b* on the head end side of the contact tip 10 is plastically deformed toward the guide hole 10*a* and an area corresponding to each recessed surface portion 3*e* on the head end side of the contact tip 10 remains in each recessed surface portion 3*e* without plastically deformed, as shown in FIG. 9, when the contact tip 10 is viewed from the head end side, the guide hole 10*a* on the head end side of the contact tip 10 has a triangular cross-sectional shape where the vertices are situated in the areas corresponding to the recessed surface portions 3*e*. Consequently, when arc welding is performed by using the reformed contact tip 10, the welding wire 11 is in contact with the inner peripheral surface of the guide hole 10*a* at two points, so that welding quality can be stabilized.

From the above, according to the first embodiment of the present invention, since the contact tip 10 is out of contact with the recessed surface portions 3*e* when the contact tip 10 is plastically deformed by the projecting portions 3*b*, the absence of escape space for the plastically deformed part of the contact tip 10 as in Patent Literature 1 can be avoided. Since the force for plastically deforming the contact tip 10 is reduced as a consequence, it is unnecessary to make the capability of the contact tip reforming device 1 higher than necessary, so that a low-cost contact tip reforming device 1 can be achieved.

Moreover, since the parts corresponding to the projecting portions 3*b* of the contact tip 10 are in line contact with the outer peripheral surface of the core metal 3*f* when the head end side of the contact tip 10 is plastically deformed, the area of contact between the inner peripheral surface of the guide hole 10*a* after plastic deformation and the outer peripheral surface of the core metal 3*f* is small compared with the structure as in Patent Literature 1, so that the contact tip reforming device 1 can be prevented from being stopped by the core metal 3*f* being unable to be pulled out from the guide hole 10*a*.

Further, since the core metal 3*f* is circular in cross section, it never occurs that the angular part of the outer peripheral surface is deformed due to wear when reforming of the contact tip 10 is repetitively performed as in Patent Literature 1, so that the maintenance cycle can be prolonged.

Moreover, since the guide surface 3*d* is provided on the contact tip 10 insertion opening side of the plastic processing hole 3*a* on each projecting portion 3*b*, when the first die 2 and the second die 3 are caused to approach each other, the contact tip 10 is smoothly guided into the plastic processing hole 3*a* with the central axis of the contact tip 10 being made to coincide with the hole center line C1 of the plastic processing hole 3*a* by the guide surfaces 3*d*, so that the cross-sectional shapes of the guide holes 10*a* of the contact tips 10 to be reformed can be made the same.

Moreover, since three projecting portions 3*b* are provided at regular intervals in the circumferential direction of the hole center line C1 on the plastic processing hole 3*a* of the first embodiment, the cross-sectional area of the guide hole 10*a* on the head end side of the reformed contact tip 10 is large compared with when four or more projecting portions 3*b* are provided in the circumferential direction of the hole center line C1. Consequently, as shown in FIG. 10, powder 12 such as spatter, fume or copper plating is not readily accumulated in the guide hole 10*a* when arc welding is performed, so that stopping of supply of the welding wire 11 can be reduced.

While in the first embodiment, three projecting portions 3*b* are provided at regular intervals in the circumferential direction of the hole center line C1 and three recessed surface portions 3*e* are provided between the projecting portions 3*b* on the plastic processing hole 3*a*, the present invention is not limited thereto; for example, a structure may be adopted in which four or more projecting portions 3*b* are provided at regular intervals in the circumferential direction of the hole center line C1 and the recessed surface portions 3*e* of the same number as the projecting portions 3*b* are provided at regular intervals in the circumferential direction of the hole center line C1.

Moreover, while the second die 3 is caused to approach and separate from the first die 2 by the pressing machine 4 in the first embodiment of the present invention, the first die 2 may be caused to approach and separate from the second die 3.

Second Embodiment

Figure 11:
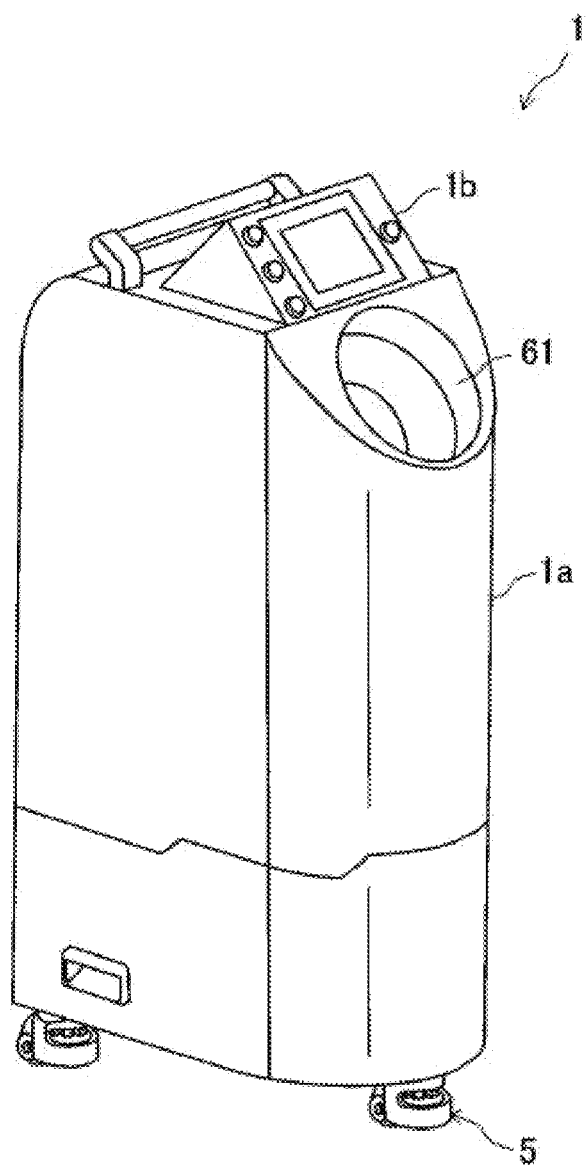
FIG. 11 is a perspective view of a contact tip reforming device according to a second embodiment of the present invention.

FIG. 11 shows a contact tip reforming device 1 of a second embodiment of the present invention. Since the second embodiment discloses details of the device other than the first die 2 and the second die 3 and the first die 2 and the second die 3 are the same as those of the first embodiment, only parts different from those of the first embodiment will be described below.

Figure 12:
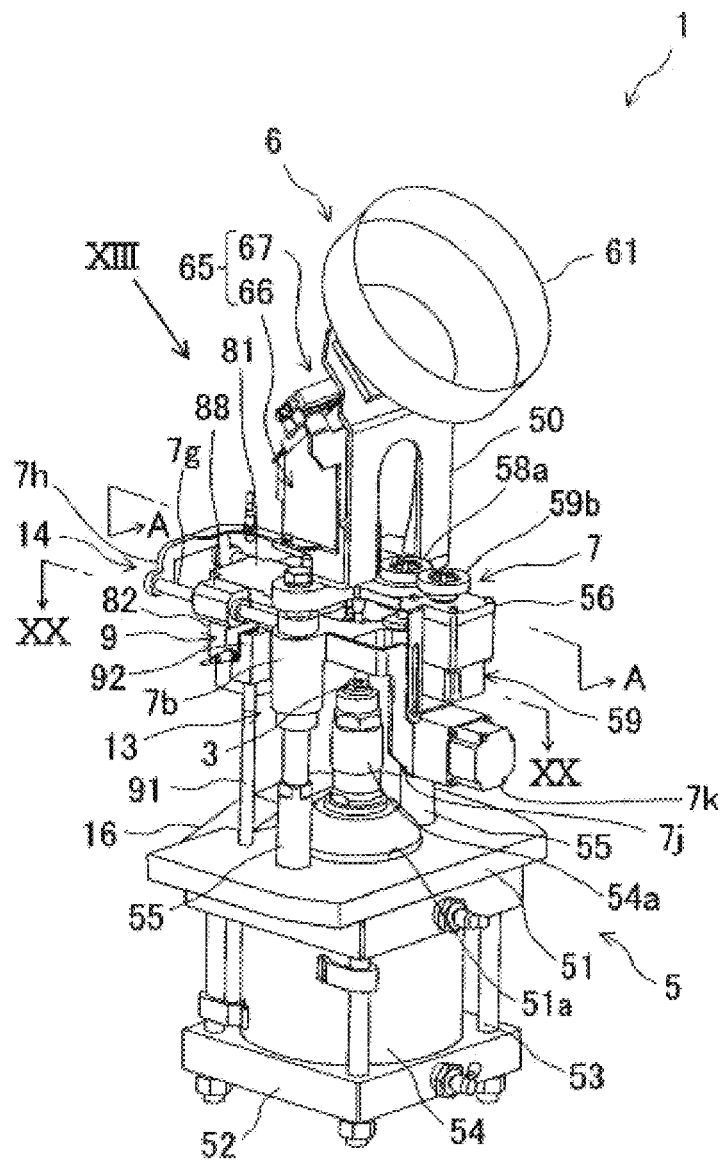
FIG. 12 is a perspective view showing a condition where a protection cover of the contact tip reforming device according to the second embodiment of the present invention is detached.

As shown in FIGS. 11 and 12, the contact tip reforming device 1 of the second embodiment is provided with: a body frame 5 constituting a skeletal structure of the contact tip reforming device 1; and a protection cover 1*a* covering the body frame 5 in its entirety.

The protection cover 1*a* has a box shape that is substantially semicircular in cross section on the device front side and extends vertically, and on the top thereof, an operation panel 1*b* to operate the contact tip reforming device 1 is provided.

The body frame 5 has an upper base plate 51 and a lower base plate 52 disposed so as to face vertically, and in the center of the upper base plate 51, a communication hole 51*a* is formed.

The corresponding four corners of the upper and lower base plates 51 and 52 are each coupled by a coupling shaft 53 extending in the vertical direction, and the upper and lower base plates 51 and 52 and the coupling shafts 53 constitute a substantially rectangular parallelepiped frame structure.

Between the upper and lower base plates 51 and 52, a large-size fluid pressure cylinder 54 (pressing machine) is fixed, and the fluid pressure cylinder 54 is provided with a vertically extendable and contractable piston rod 54*a*.

The piston rod 54*a* extends above the upper base plate 51 through the communication hole 51*a*, and to the head end thereof, the second die 3 which is substantially disc-shaped is fixed.

On the upper surface of the upper base plate 51, a pair of cylindrical first guide bars 55 extending vertically are provided with the piston rod 54a in between, and to the upper ends of the first guide bars 55, a support plate 56 substantially T-shaped in plan view is fixed so as to lie over both of the first guide bars 55.

Figure 18:
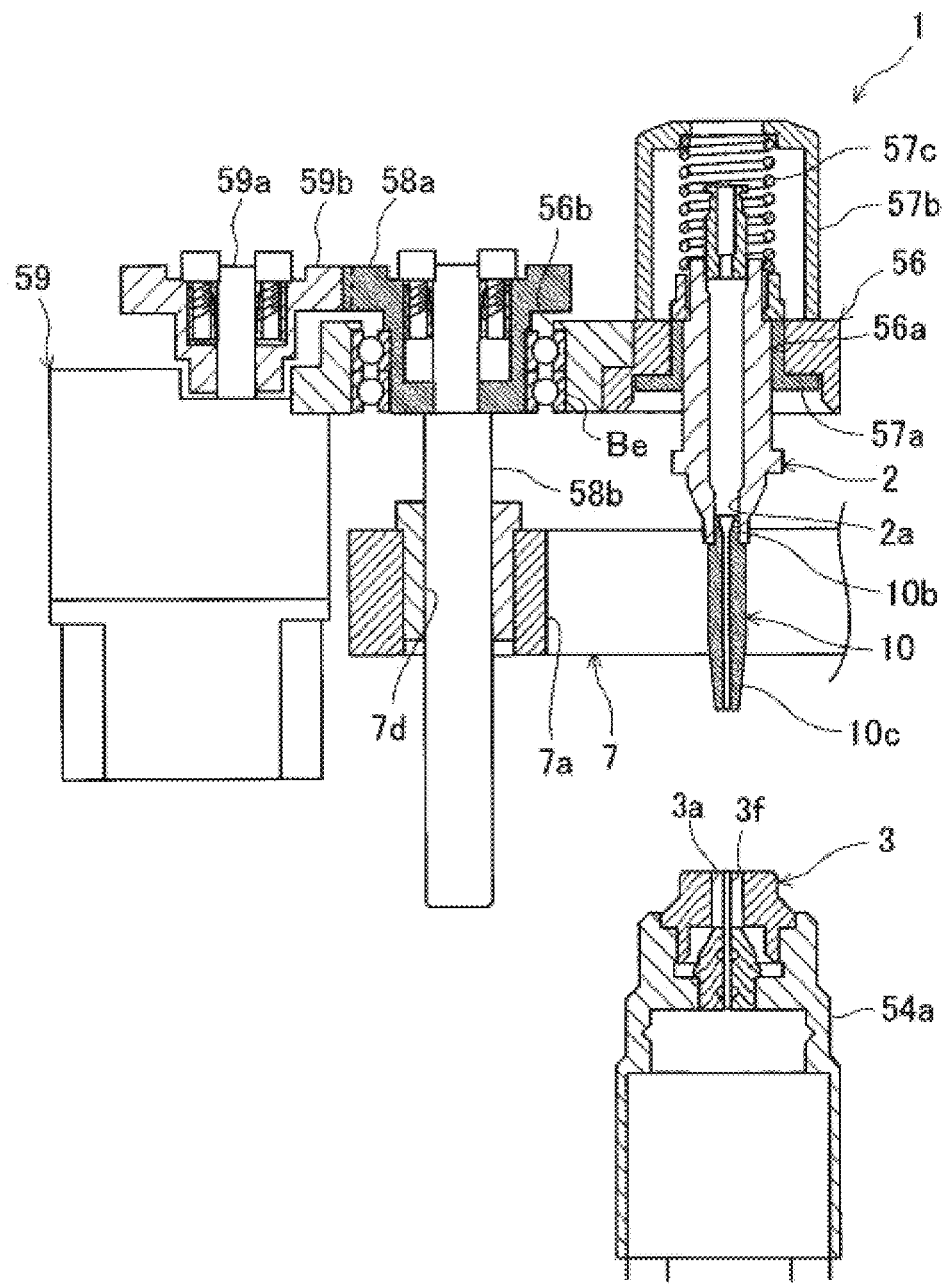
FIG. 18 is a cross-sectional view on line A-A of FIG. 12 and is a view showing surroundings of first and second dies.
Figure 19:
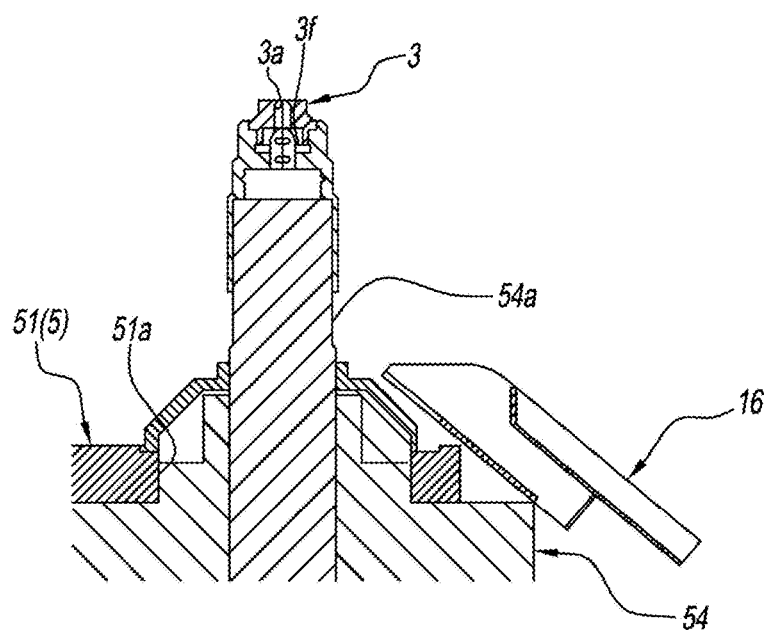
FIG. 19 is a cross-sectional view on line A-A of FIG. 12 and is a view showing surroundings of a discharge slope.
Figure 22:
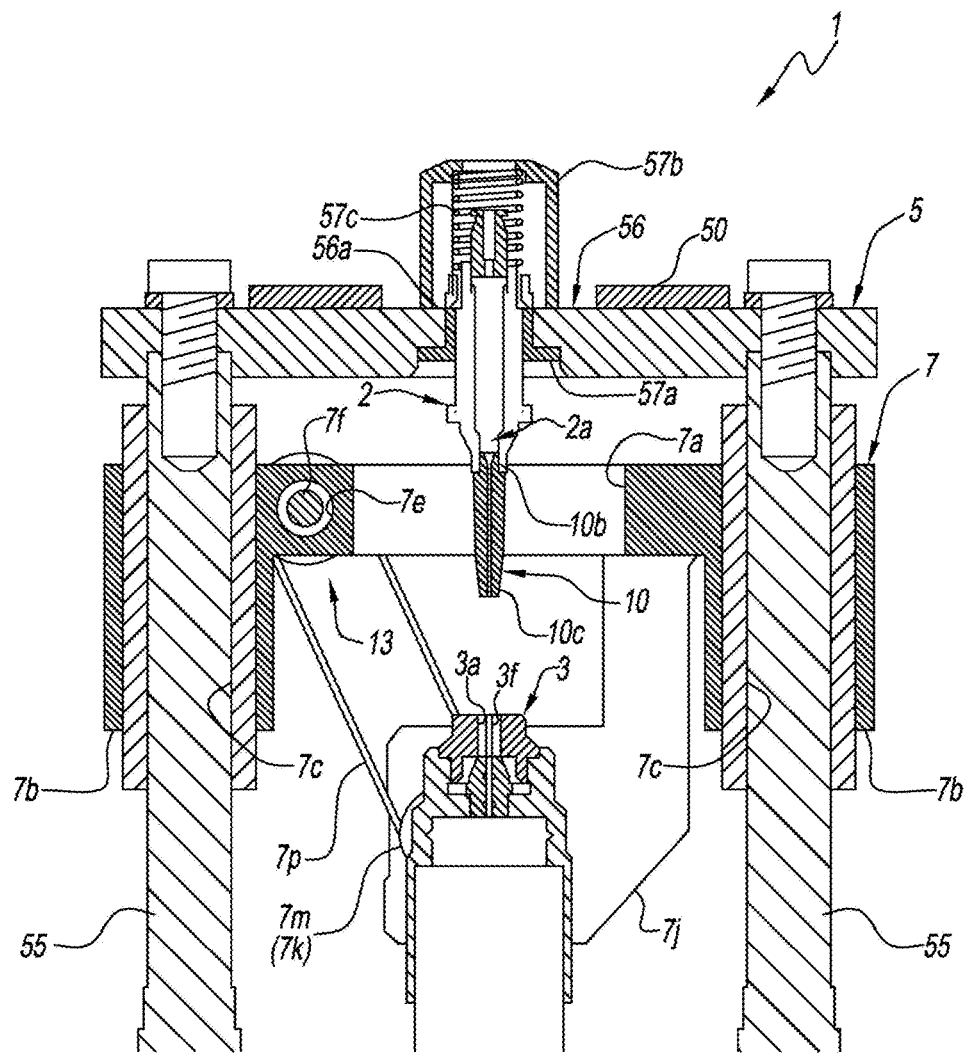
FIG. 22 is a cross-sectional view on line XXIII-XXIII of FIG. 20.

In the position of the support plate 56 facing the piston rod 54a, as shown in FIGS. 18 and 22, a first attachment hole 56a passing through vertically is formed, and to the first attachment hole 56a, the first die 2 substantially cylindrical and extending vertically is attached so as to be vertically slidable through a sleeve 57a.

In a lower part of the first die 2, the female screw portion 2a is formed where the male screw portion 10b is screwable so that the contact tip 10 is fixed to the first die 2 in a state of extending vertically.

In the position on the upper surface of the support plate 56 corresponding to the first attachment hole 56a, a substantially cylindrical cylinder cover 57b the cylinder center line of which extends in the vertical direction is fixed so as to cover the first attachment hole 56a, and inside the cylinder cover 57b, a coil spring 57c is accommodated.

The coil spring 57c has its upper end abutting on the inner surface of the cylinder cover 57b and has its lower end abutting on the first die 2, and pushes the first die 2 downward.

On the device front side, of the first attachment hole 56a, of the support plate 56, a second attachment hole 56b is formed.

To the second attachment hole 56b, a first driven gear 58a is attached so as to be rotatable about the vertically extending rotation axis through a bearing Be, and to the first driven gear 58a, a first screw shaft 58b extending downward from the center of the lower end of the first driven gear 58a is attached so as to rotate integrally.

To the device front side end portion of the support plate 56, a first driving motor 59 is fixed a rotary shaft 59a of which extends upward.

To the rotary shaft 59a, a first driving gear 59b meshing with the first driven gear 58a is attached so as to rotate integrally, and by the rotary shaft 59a rotating in the normal or reverse direction, the first screw shaft 58b rotates in the normal or reverse direction through the first driving gear 59b and the first driven gear 58a.

Substantially to the center of the upper surface of the support plate 56, an attachment bracket 50 is fixed that is substantially of a U shape opened downward in front view and is substantially of an L shape in side view, and on the attachment bracket 50, a tip supply unit 6 (tip supply means) is provided that supplies a plurality of unreformed contact tips 10 one by one toward the downstream side of the device.

Figure 13:
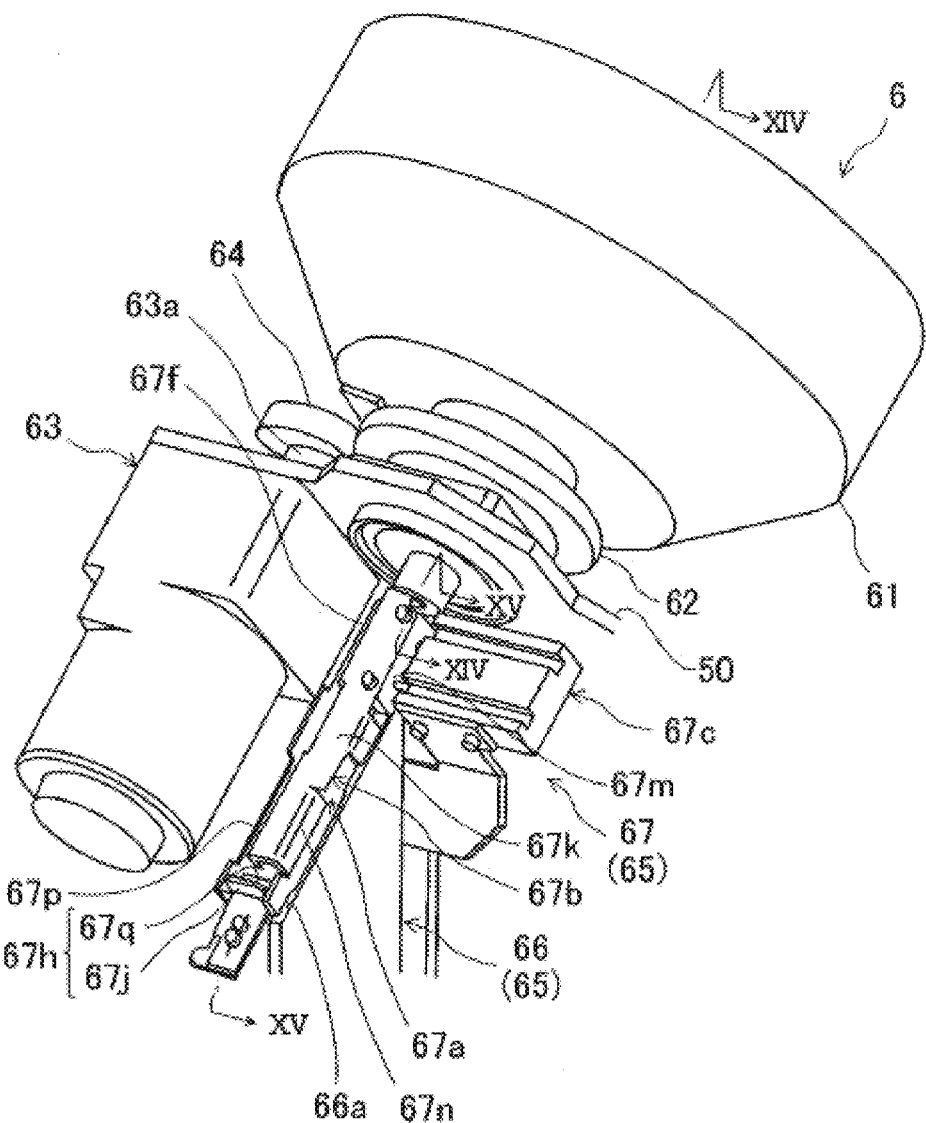
FIG. 13 is a view on arrow XIII of FIG. 12.
Figure 14:
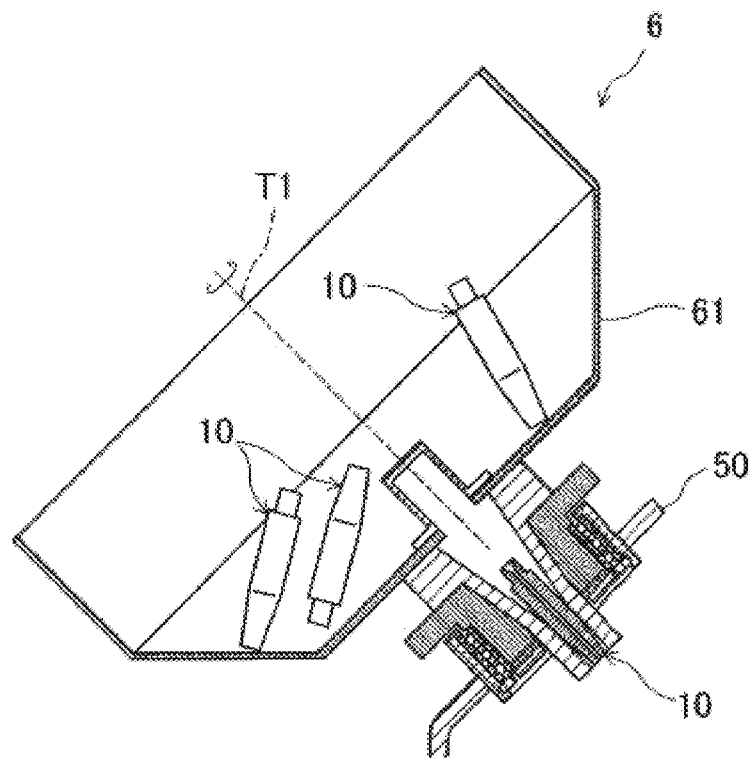
FIG. 14 is a cross-sectional view on line XIV-XIV of FIG. 13.

As shown in FIGS. 13 and 14, the tip supply unit 6 is provided with a funnel-shaped hopper 61, and the hopper 61 is capable of storing therein a plurality of unreformed contact tips 10.

The hopper 61 is supported above the attachment bracket 50 so as to be rotatable about a center line T1 extending obliquely, and to the lower end side of the hopper 61, a second driven gear 62 the central axis of which coincides with the center line T1 is fixed so as to rotate integrally.

Moreover, to the upper part of the attachment bracket 50, as shown in FIG. 13, a second driving motor 63 is fixed a rotary shaft 63a of which extends in the same direction as the center line T1, and to the rotary shaft 63a, a second driving gear 64 meshing with the second driven gear 62 is attached so as to rotate integrally.

By the rotary shaft 63a rotating, the hopper 61 is rotated through the second driving gear 64 and the second driven gear 62, and by the rotation of the hopper 61, the contact tips 10 stored inside the hopper 61 are sent out one by one from the lower end opening to the downstream side of the device with the central axes thereof following the center line T1.

Figure 15:
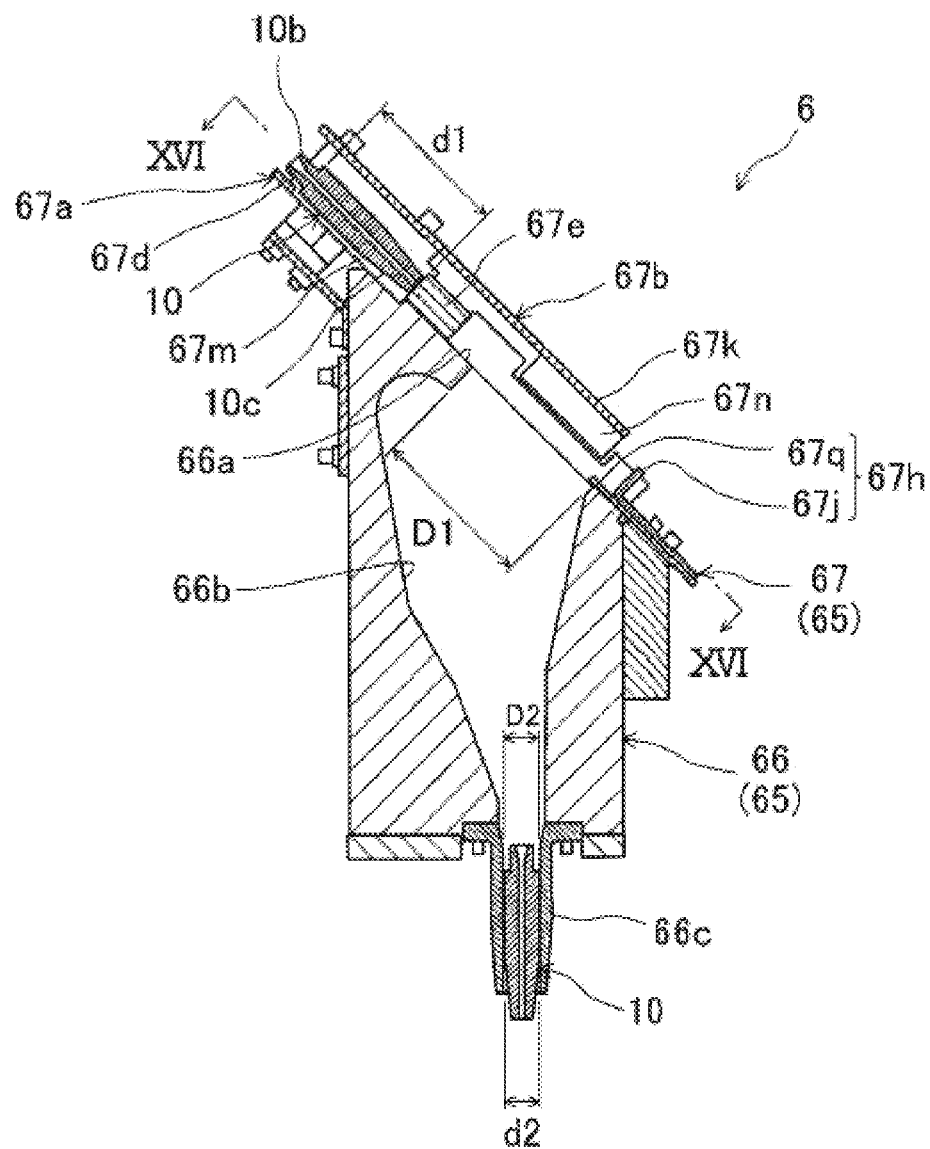
FIG. 15 is a cross-sectional view on line XV-XV of FIG. 13.
Figure 16:
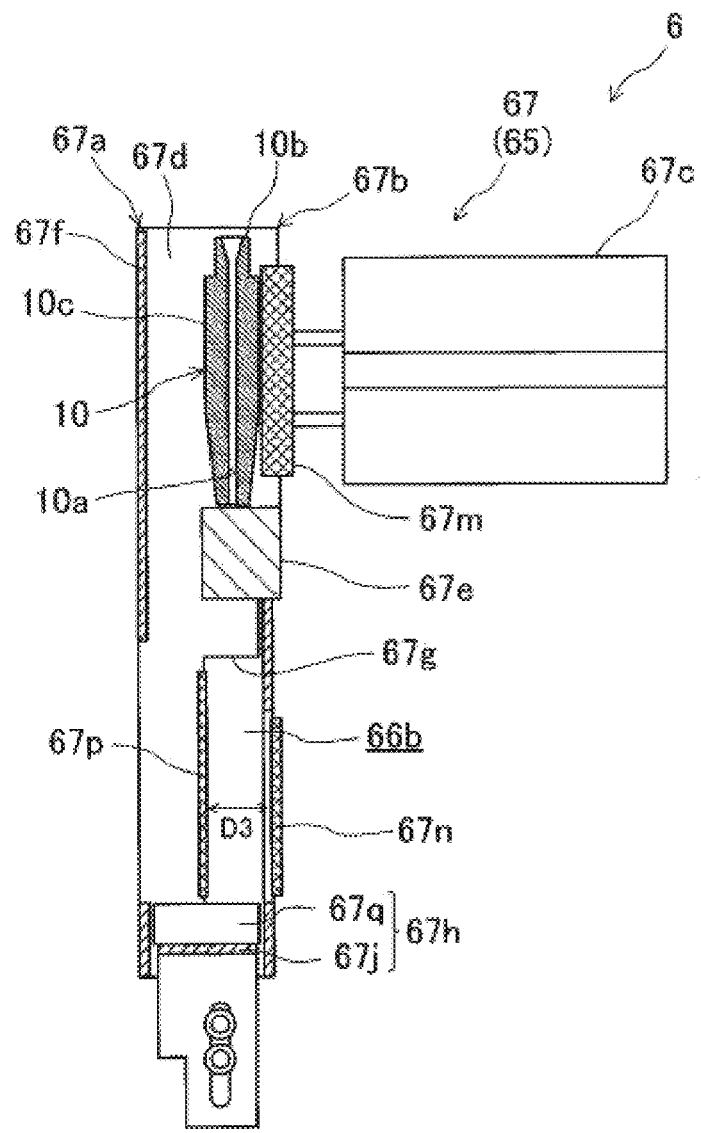
FIG. 16 is a cross-sectional view on line XVI-XVI of FIG. 15.

Moreover, as shown in FIGS. 15 and 16, the tip supply unit 6 is provided with a tip orientation aligning unit 65 that aligns the contact tips 10, successively supplied to the downstream side, so that the head ends thereof are oriented in the same direction.

The tip orientation aligning unit 65 is provided with: a block body 66 fixed to a part of a lower part of the attachment bracket 50 extending to the device back side; and a tip guide mechanism 67 attached to an upper part of the block body 66 and guiding obliquely downward the contact tips 10 supplied from the lower end opening of the hopper 61.

The block body 66 has a box shape extending vertically and being thin in the thickness in the device width direction, and an upper surface 66a of the block body 66 has a shape linearly extending in an obliquely downward direction from a position corresponding to the lower end portion of the hopper 61.

Inside the block body 66, a guide hole portion 66b is formed that has a shape that passes through vertically and whose dimension in the extension direction of the upper surface 66a gradually decreases downward.

The upper end opening of the guide hole portion 66b is formed on one side of the lower area of the upper surface 66a of the block body 66, and a dimension D1 of the upper end opening of the guide hole portion 66b in the extension direction of the upper surface 66a corresponds to a dimension d1 of the body portion 10c of the contact tip 10 in the length direction.

On the other hand, a dimension D2 of the lower end opening of the guide hole portion 66b corresponds to a width dimension d2 of the contact tip 10.

In a position corresponding to the lower end opening of the guide hole portion 66b of the block body 66, a guide cylinder 66c is attached the cylinder center line of which extends in the vertical direction and that guides the contact tips 10 downward with the center line thereof extending in the vertical direction.

As shown in FIG. 13, the tip guide mechanism 67 is provided with: a lower frame 67a having a substantially U-shaped cross section opened upward and linearly extending in an obliquely downward direction along the upper surface 66a; an upper frame 67b disposed above the lower frame 67a, having a substantially U-shaped cross section opened downward and linearly extending in an obliquely downward direction along the lower frame 67a; and an electric cylinder 67c disposed on a side on the upper end side of the upper frame 67b and sliding the upper frame 67b in the device width direction, and the lower frame 67a guides the contact tips 10 supplied from the hopper 61, obliquely downward by its own weight with the center line thereof extending obliquely downward.

The lower frame 67a is provided with an inclined surface portion 67d extending along the upper surface 66a of the block body 66, and a half part on one side of the upper edge portion of the inclined surface portion 67d is the position corresponding to the lower end of the hopper 61.

On a half part on one side in a middle part of the lower frame 67a, a block-shaped first stopper portion 67e is provided, and as shown in FIG. 16, the contact tip 10 supplied from the hopper 61 and guided obliquely downward on a half part on one side of the inclined surface portion 67*d* is in contact with the first stopper portion 67*e*, whereby the guiding of the contact tip 10 in the obliquely downward direction is temporarily stopped.

Substantially on an upper half part on the other side edge portion of the inclined surface portion 67*d*, a first guide wall portion 67*f* is provided that extends obliquely downward along the inclined surface portion 67*d*.

Moreover, on one side of the lower half of the inclined surface portion 67*d*, a notch 67*g* is formed that has a shape conforming to the upper end opening of the guide hole portion 66*b*.

Further, on a lower half part of the inclined surface portion 67*d*, a second stopper portion 67*h* substantially L-shaped in side view is provided, and the inclined surface portion 67*d* is provided with: a first plate portion 67*q* disposed along the upper surface 66*a* of the block body 66; and a second plate portion 67*j* extending in the plate thickness direction of the first plate portion 67*q*.

The first plate portion 67*q* has a shape extending in a horizontal direction orthogonal to the extension direction of the inclined surface portion 67*d* and toward the guide hole portion 66*b* such that the extension side thereof is a position continuous with the lower part of the lower edge portion of the upper end opening of the guide hole portion 66*b*.

Figure 25:
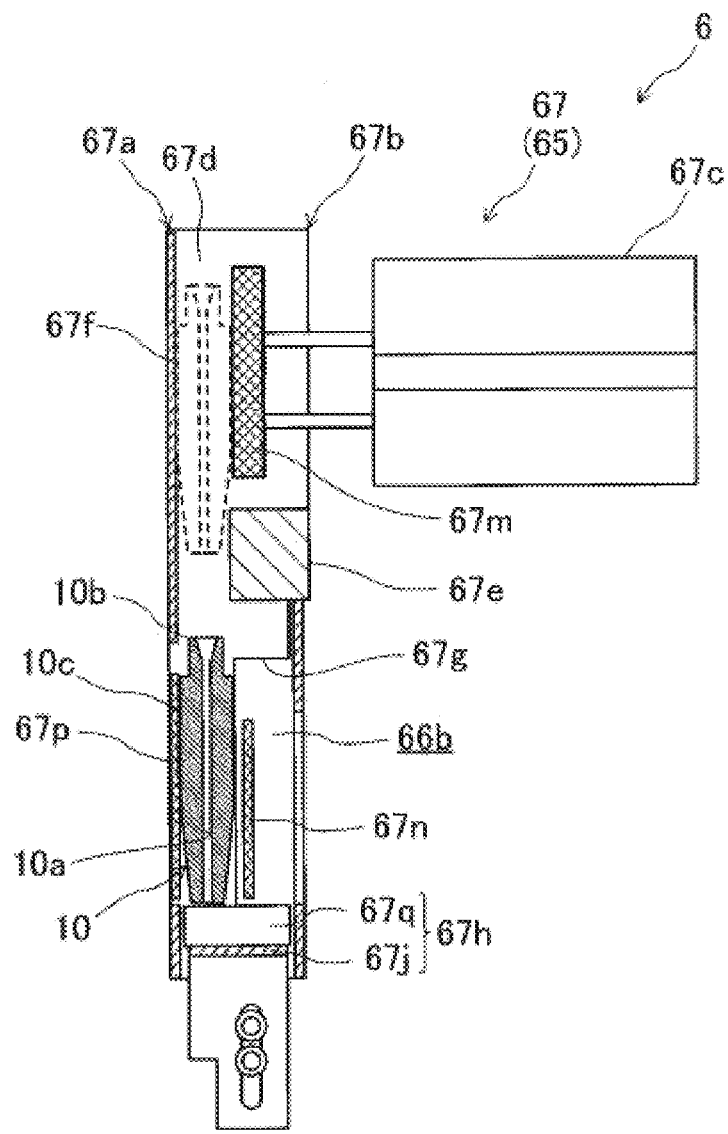
FIG. 25 is a view showing a condition in the middle of the guiding of the contact tip to the tip holding unit after FIG. 24.

As shown in FIG. 25, when the contact tip 10 is guided by the other side half of the inclined surface portion 67*d* so that the head end side thereof faces downward, the first plate portion 67*q* is in contact with the head end of the contact tip 10 to stop the contact tip 10 from being further guided obliquely downward.

Figure 29:
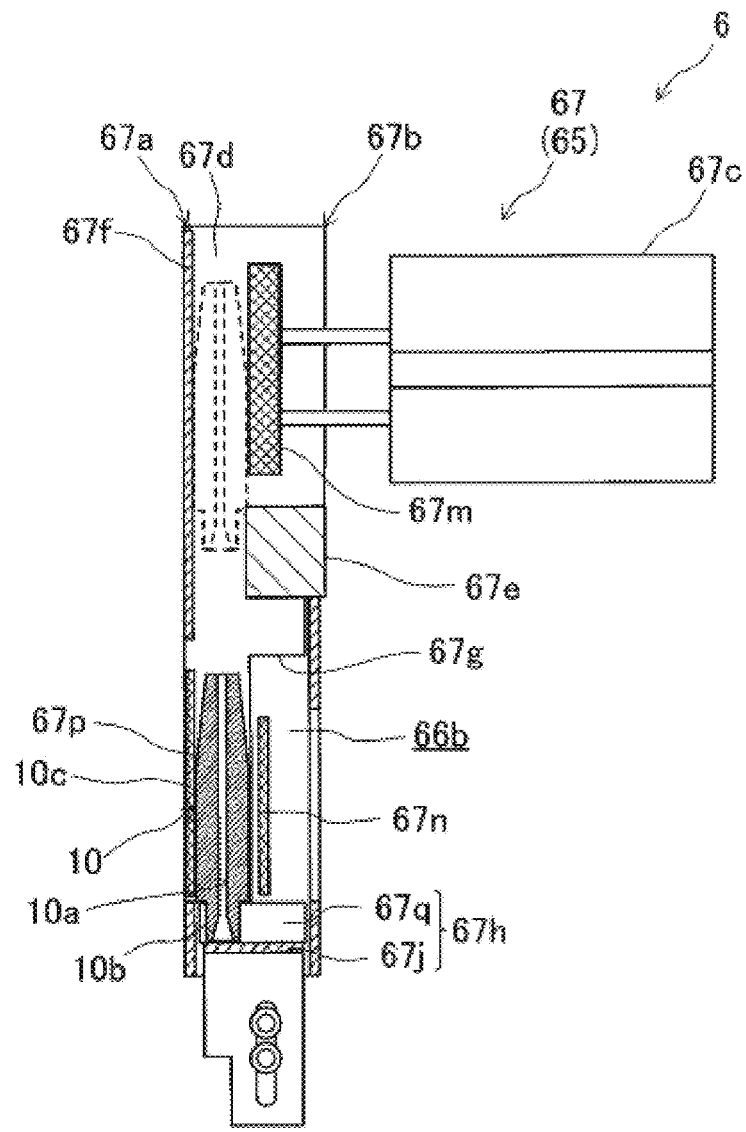
FIG. 29 is a view showing a condition in the middle of guiding of the contact tip to the tip holding unit after FIG. 28.

Moreover, as shown in FIG. 29, the first plate portion 67*q* is set in a shape that is in contact with the body portion 10*c* without being in contact with the male screw portion 10*b* of the contact tip 10 when the contact tip 10 is guided by the other side half of the inclined surface portion 67*d* so that the base end side thereof faces downward.

The upper frame 67*b* is provided with a cover surface portion 67*k* extending obliquely downward along the inclined surface portion 67*d*, and substantially on an upper half part on one side edge portion of the cover surface portion 67*k*, a first pressing wall portion 67*m* is provided that extends obliquely downward along the cover surface portion 67*k*.

Moreover, the lower half part of the cover surface portion 67*k* is small in the dimension in the device width direction compared with the upper half part thereof, and substantially on a lower half part on one side edge portion of the cover surface portion 67*k*, a second guide wall portion 67*n* extending obliquely downward along the cover surface portion 67*k* is provided on the extension line of the first pressing wall portion 67*m*.

On the other hand, substantially on a lower half part on the other side edge portion of the cover surface portion 67*k*, a second pressing wall portion 67*p* is provided that extends obliquely downward along the cover surface portion 67*k*, and a dimension D3 between the second guide wall portion 67*n* and the second pressing wall portion 67*p* corresponds to the with dimension d2 of the contact tip 10.

Figure 24:
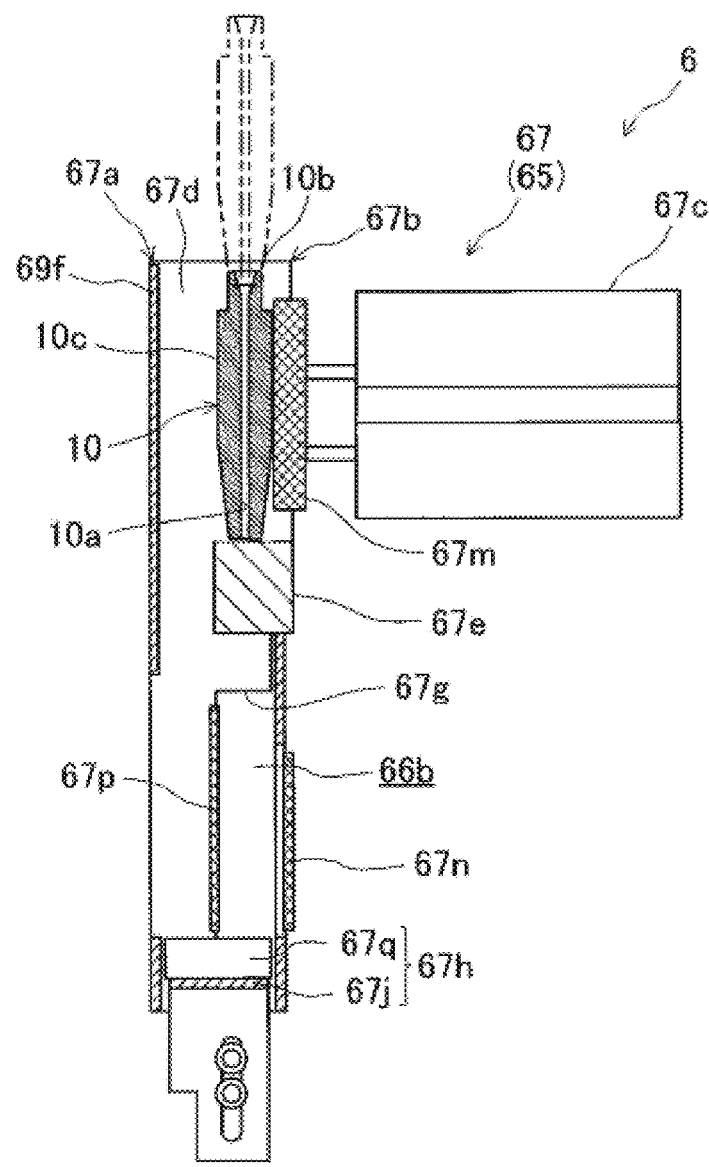
FIG. 24 is a view, corresponding to FIG. 16, showing a condition immediately after guiding of a contact tip with the head end side thereof facing downward to a tip holding unit is started.
Figure 28:
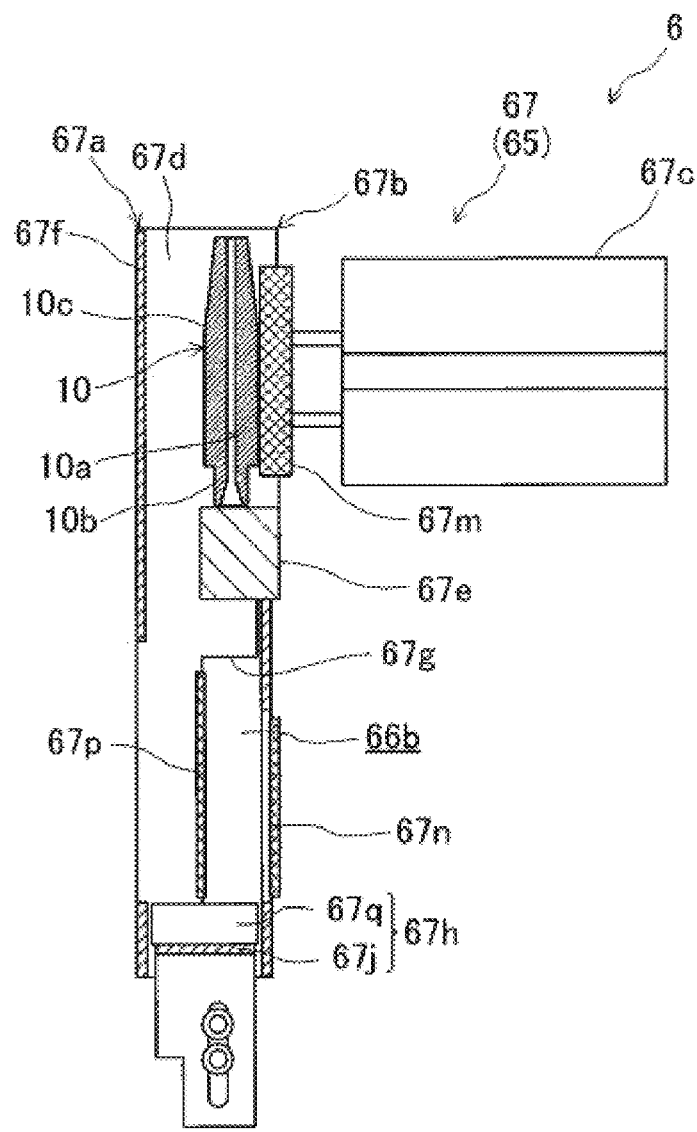
FIG. 28 is a view, corresponding to FIG. 16, showing a condition immediately after guiding of the contact tip with the base end side facing downward to the tip holding unit is started.

When the upper frame 67*b* is slid to one side in the horizontal direction by the electric cylinder 67*c* under a condition where the contact tip 10 is temporarily stopped by the first stopper portion 67*e* as shown in FIGS. 24 and 28, the first pressing wall portion 67*m* moves the contact tip 10 to one side in the horizontal direction until it is in contact with the first guide wall portion 67*f* as shown in FIGS. 25 and 29, so that the contact of the contact tip 10 with the first stopper portion 67*e* is released and the contact tip 10 is guided obliquely downward from the other side half of the inclined surface portion 67*d*.

Figure 26:
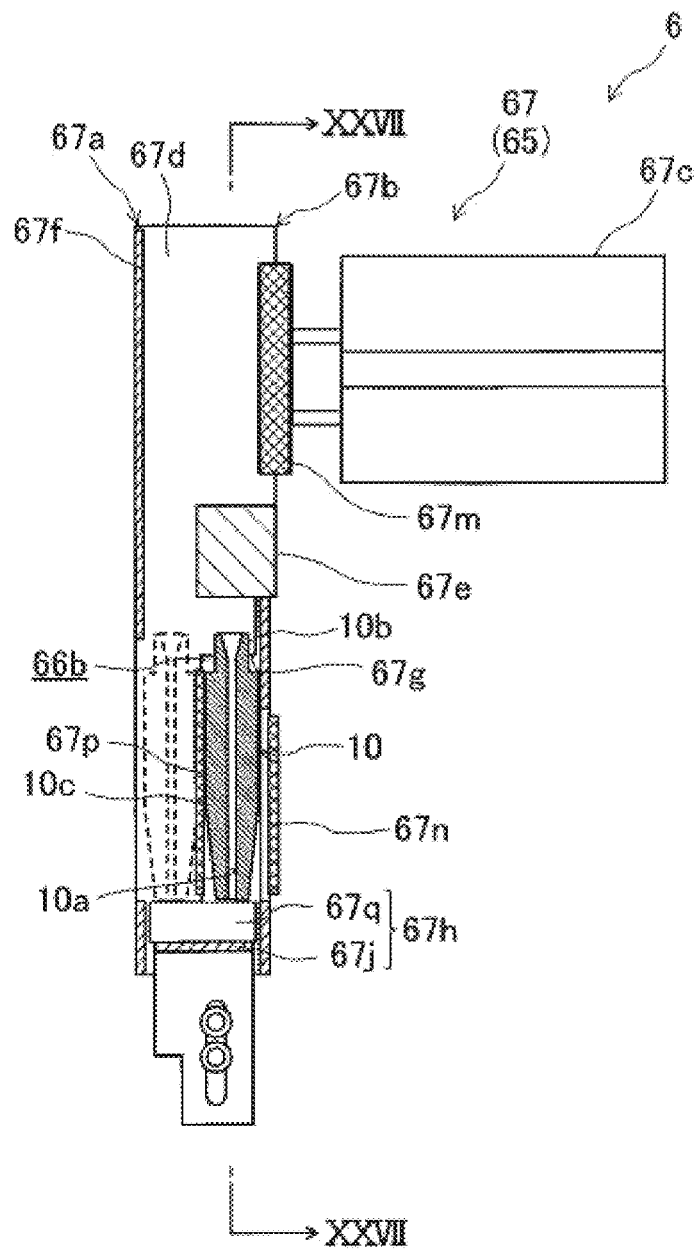
FIG. 26 is a view showing a condition immediately before the guiding of the contact tip to the tip holding unit is finished after FIG. 25.
Figure 27:
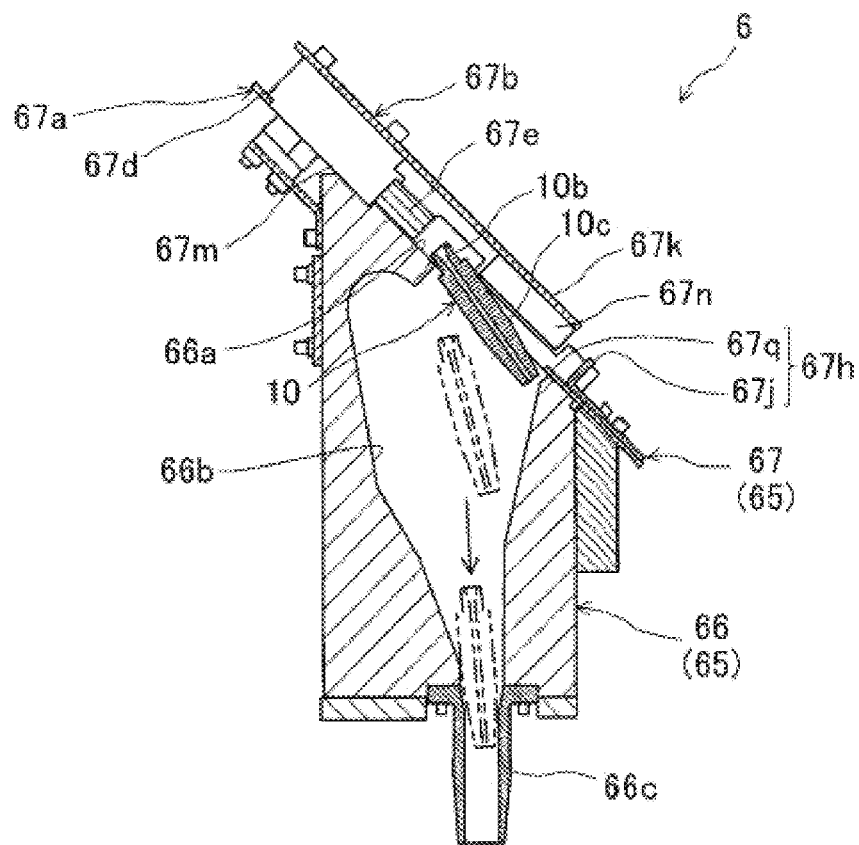
FIG. 27 is a cross-sectional view on line XXVII-XXVII of FIG. 26.
Figure 30:
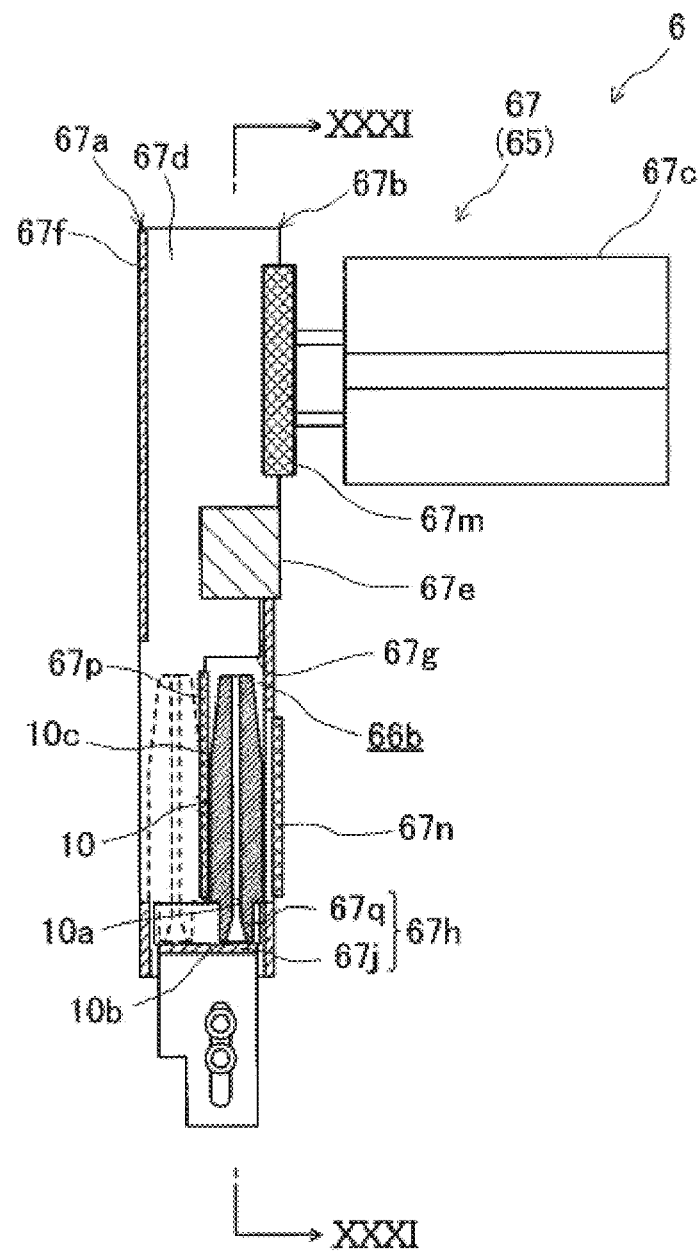
FIG. 30 is a view showing a condition immediately before the guiding of the contact tip to the tip holding unit is finished after FIG. 29.
Figure 31:
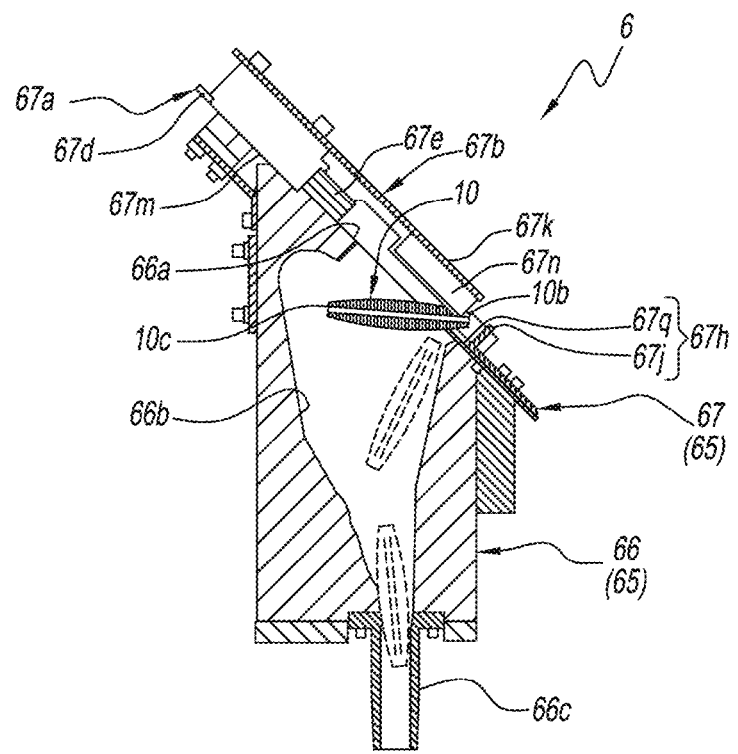
FIG. 31 is a cross-sectional view on line XXXI-XXXI of FIG. 30.

The contact tip 10 guided obliquely downward on the other side half of the inclined surface portion 67*d* enters between the second guide wall portion 67*n* and the second pressing wall portion 67*p* and comes into contact with the second stopper portion 67*h* to be stopped from being further guided obliquely downward, and when the upper frame 67*b* is slid to the other side in the horizontal direction by the electric cylinder 67*c* under this condition, as shown in FIGS. 26 and 30, the second pressing wall portion 67*p* moves the contact tip 10 to the other side in the horizontal direction, so that as shown in FIGS. 27 and 31, the contact tip 10 drops into the guide hole portion 66*b* through the notch 67*g*.

Figure 17:
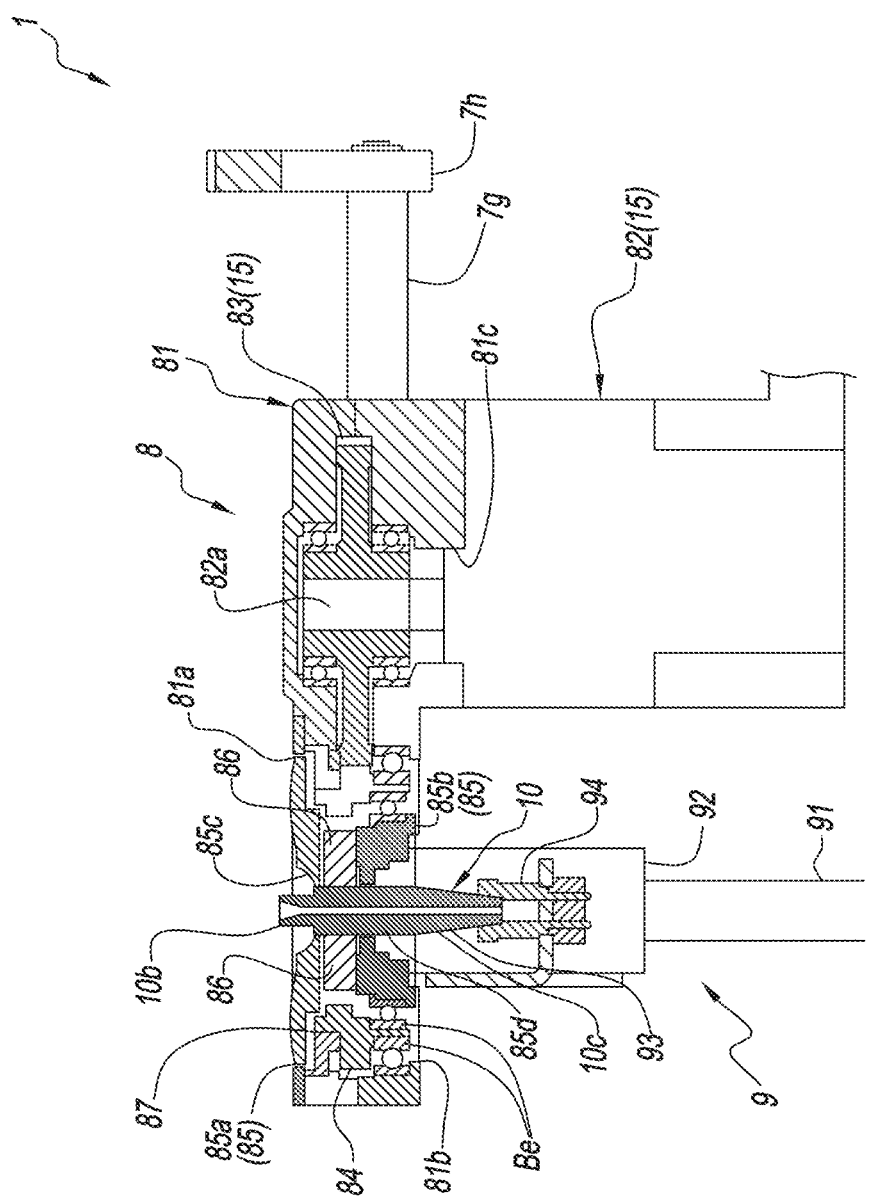
FIG. 17 is a cross-sectional view on line A-A of FIG. 12 and is a view showing surroundings of a holding unit.

Then, as shown in FIG. 17, the contact tip 10 dropping in the guide hole portion 66*b* is supplied to a first region R1 through the guide cylinder 66*c* with the center line thereof being oriented vertically.

In the first region R1, a tip positioning unit 9 is disposed that receives the contact tip 10 supplied from the tip supply unit 6 and positions it.

Figure 20:
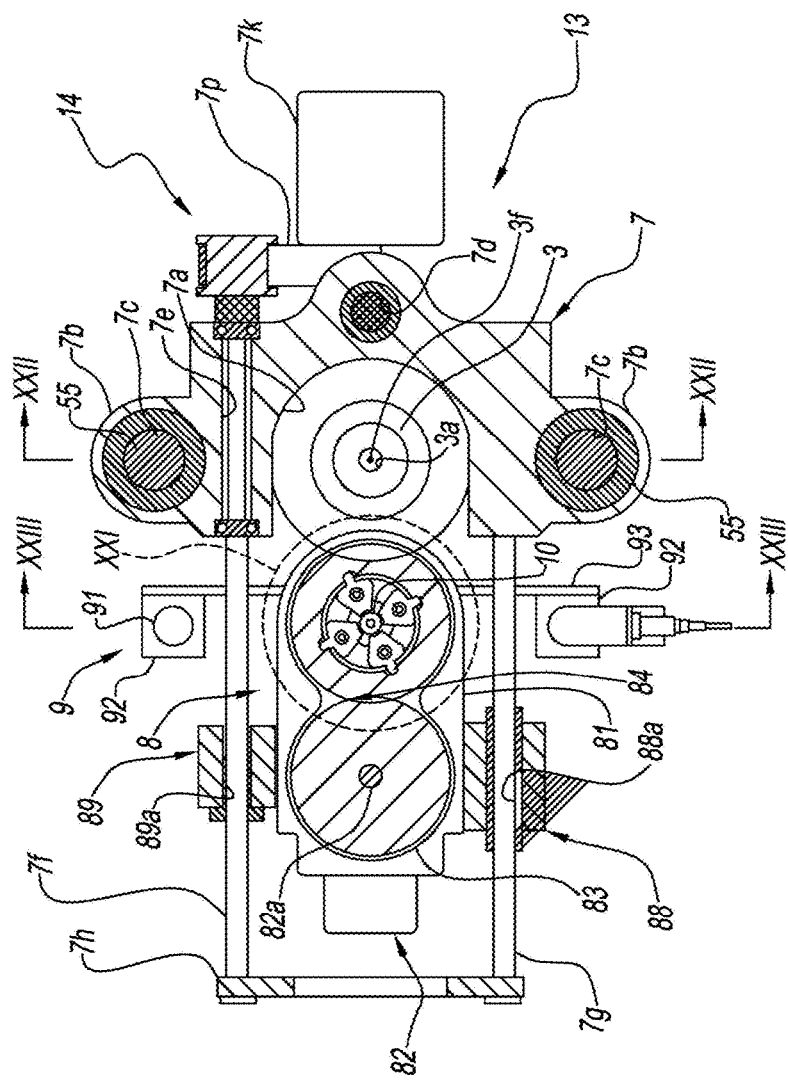
FIG. 20 is a cross-sectional view on line XX-XX of FIG. 12.
Figure 23:
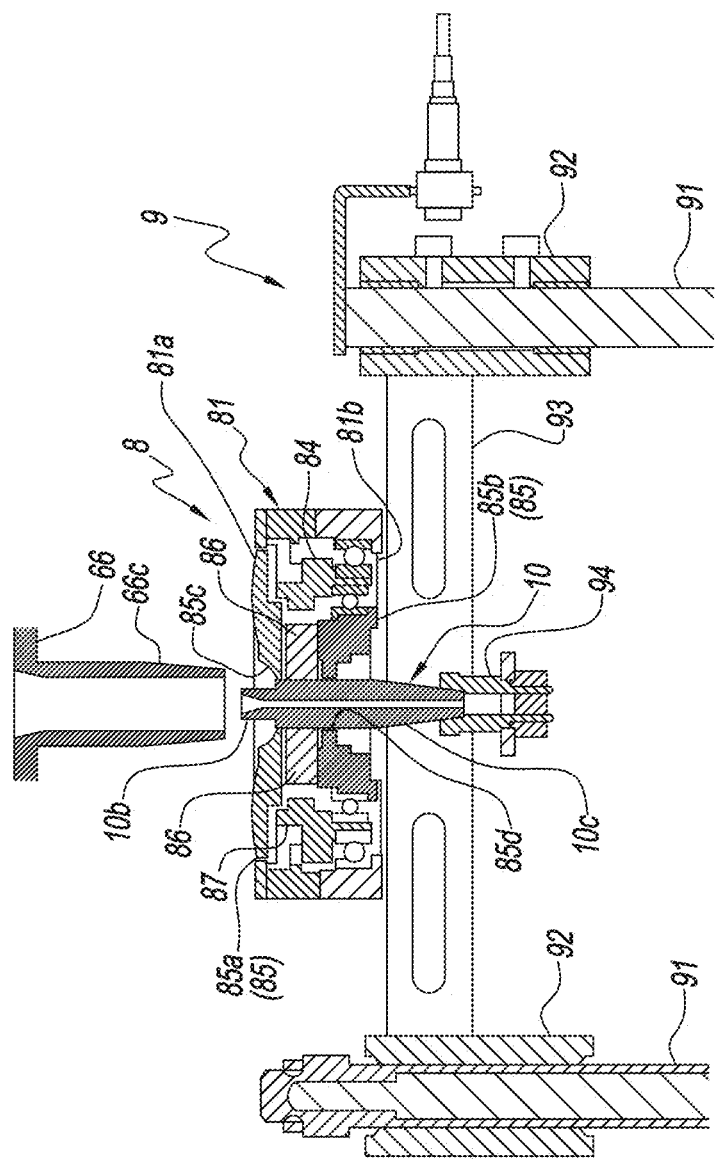
FIG. 23 is a cross-sectional view on line XXIII-XXIII of FIG. 20.

As shown also in FIGS. 20 and 23, the tip positioning unit 9 is provided on the device back side of the first guide bars 55 on the upper surface of the upper base plate 51 and is provided with a pair of third guide bars 91 having an elongate cylindrical shape extending vertically, and to each guide bar 91, a slider 92 is attached so as to be vertically slidable.

Between the third guide bars 91, a belt-like plate 93 extending in the device width direction is provided, and the end portions of the belt-like plate 93 are fixed to the sliders 92.

To the center of the belt-like plate 93, a tip support member 94 is fixed that has a substantially cylindrical shape the cylinder center line of which extends vertically.

The tip support member 94 the upper end opening side inner peripheral surface of which has a shape conforming to the head end side outer peripheral surface of the contact tip 10 is capable of supporting the contact tip 10 with the head end side thereof facing downward and the center line extending in the vertical direction.

Between the upper base plate 51 and the support plate 56, as shown in FIGS. 20 and 22, a first slide body 7 substantially U-shaped in plan view is disposed.

The first slide body 7 is provided with: a substantially semicircular notched concave portion 7*a* opened to the device back side and formed in a position corresponding to the second die 3; and a pair of projecting portions 7*b* projecting symmetrically on both sides in the device width direction.

The projecting portions 7*b* each have a slide hole 7*c* formed so as to pass through in the vertical direction, and the first guide bars 55 are slidably inserted in the slide holes 7*c*, respectively.

On the device front side of the first slide body 7, a first female screw hole 7*d* passing through vertically is formed, and in the first female screw hole 7*d*, the first screw shaft 58*b* is screwed. That is, the first slide body 7 and the first screw shaft 58*b* form a ball screw structure.

Moreover, between the notched concave portion 7*a* and the slide hole 7*c* on one side in the device width direction of the first slide body 7, a rotary support hole 7*e* linearly extending in the device front-back direction is formed so as to pass through, and to the rotary support hole 7*e*, a second screw shaft 7*f* linearly extending to the device back side is attached so as to be rotatable about the center line thereof.

On the other hand, between the notched concave portion 7a and the slide hole 7c on the other side in the device width direction of the first slide body 7, a second guide bar 7g linearly extending in the device front-back direction is provided.

The second guide bar 7g extends parallel to the second screw shaft 7f at a predetermined interval, and the extension end of the second screw shaft 7f and the extension end of the second guide bar 7g are coupled by a coupling plate 7h that is substantially of a U shape opened downward in front view.

Moreover, in the neighborhood of the projecting portion 7b on the other side in the device width direction of the first slide body 7, as shown in FIGS. 12 and 22, a suspended frame 7j substantially L-shaped in side view is attached so as to extend downward, and to a lower end portion of the suspended frame 7j, a third driving motor 7k is fixed so that a rotary shaft 7m extends horizontally to the device back side.

Between the end portion situated on the device front side of the second screw shaft 7f and the rotary shaft 7m of the third driving motor 7k, an endless belt 7p is laid, and when the rotary shaft 7m rotates in the normal or reverse direction, the second screw shaft 7f rotates in the normal or reverse direction about the center line thereof through the endless belt 7p.

Between the second screw shaft 7f and the second guide bar 7g, as shown in FIGS. 17 and 20, a tip holding unit 8 (tip holding means) is disposed that is capable of holding the contact tip 10 in the first region R1.

The tip holding unit 8 is provided with a second slide body 81 having a rectangular plate form with a thickness, and the device front side of the second slide body 81 has a shape conforming to the notched concave portion 7a.

On the device back side of the second slide body 81, a first guide block 88 protruding to one side is provided, and on the first guide block 88, a guide hole 88a in which the second guide bar 7g is slidably inserted is formed to as to pass through in the device front-back direction.

On the other hand, on the device back side of the second slide body 81, a second guide block 89 protruding to the other side is provided.

The second guide block 89 and the second screw shaft 7f form a ball screw structure, and on the second guide block 89, a second female screw hole 89a screwed to the second screw shaft 7f is formed so as to pass through in the device front-back direction.

The third driving motor 7k, the endless belt 7p, the second screw shaft 7f, the second guide bar 7g, the first guide block 88 and the second guide block 89 constitute horizontally moving means 14 of the present invention, and when the third driving motor 7k is driven to thereby rotate the second screw shaft 7f through the endless belt 7p, the second guide block 89 screws in and out along the second screw shaft 7f and the first guide block 88 slides along the second guide bar 7g, whereby the tip holding unit 8 moves horizontally between the first region R1 and a second region R2 that is set on a side of the first region R1 and between the first and second dies 2 and 3.

Moreover, the first driving motor 59, the first driving gear 59b, the first driven gear 58a, the first screw shaft 58b, the first guide bar 55 and the first slide body 7 constitute moving upward and downward means 13 of the present invention, and when the first driving motor 59 is driven to thereby rotate the first screw shaft 58b through the first driving gear 59b and the first driven gear 58a, the first slide body 7 screws in and out along the first screw shaft 58b and slides along the first guide bar 55, whereby the tip holding unit 8 moves upward and downward.

On the upper surface on the device front side of the second slide body 81, as shown in FIG. 17, an upper through hole 81a substantially circular in plan view is formed so as to communicate with the inside of the second slide body 81.

Moreover, in a position corresponding to the upper through hole 81a on the lower surface of the second slide body 81, a lower through hole 81b is formed so as to communicate with the inside of the second slide body 81, and a holding work space V1 serving as the position where holding of the contact tip 10 is performed is set between the upper through hole 81a and the lower through hole 81b.

Further, on the device back side of the lower surface of the second slide body 81, an opening 81c is formed that communicates with the inside of the second slide body 81.

Inside the second slide body 81, an accommodation space S1 situated in the device front side half of the second slide body 81 and an accommodation space S2 situated on the device back side are formed, and the accommodation space S1 and the accommodation space S2 are connected together in a central part of the second slide body 81.

To the device back side of the lower surface of the second slide body 81, a fourth driving motor 82 is fixed, and a rotary shaft 82a of the fourth driving motor 82 faces the accommodation space S2 through the opening 81c.

In the accommodation space S2, a third driving gear 83 the rotation axis of which extends in the vertical direction is rotatably supported by the second slide body 81 through the bearing Be.

In the accommodation space S1, a third driven gear 84 (first rotating body) and a rotary disc 85 (second rotating body) the vertically extending rotation axis C2 of which is set at the center of the holding work space V1 are provided.

The third driven gear 84 and the rotary disc 85 are formed so as to be rotatable relatively to each other about the rotation axis C2.

Figure 21:
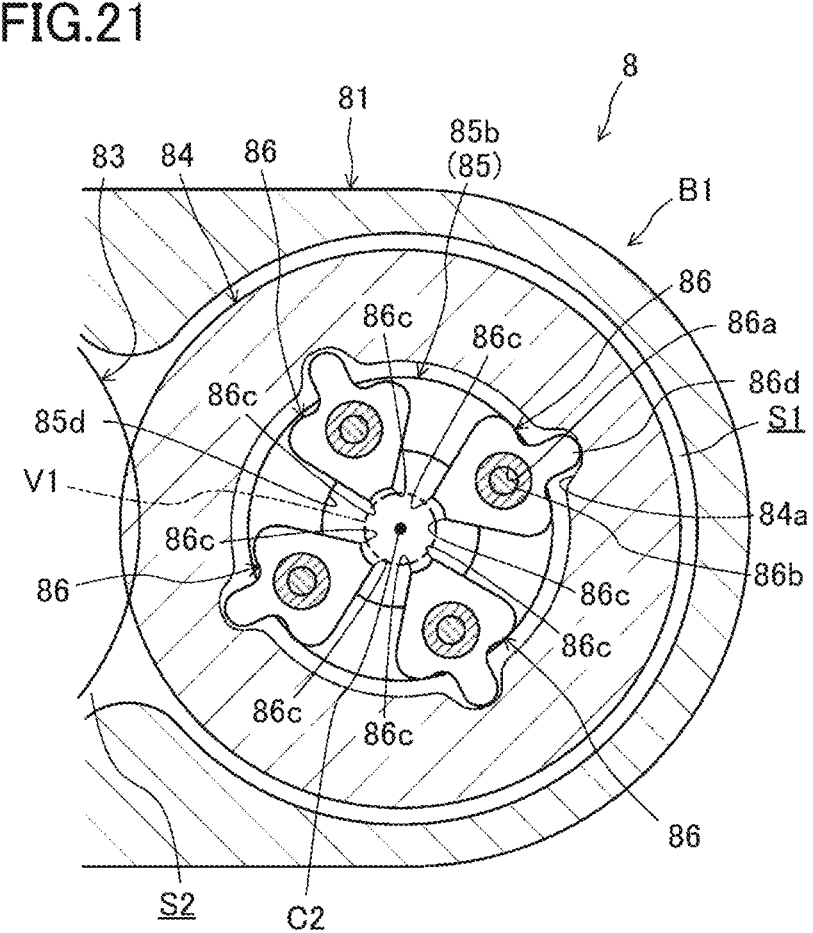
FIG. 21 is an enlarged view of part XXI of FIG. 20.

The third driven gear 84 meshes with the third driving gear 83, and as shown in FIG. 21, rotates to one side (X1 direction) through the third driving gear 83 when the fourth driving motor 82 rotates in the normal direction, and rotates to the other side (X2 direction) through the third driving gear 83 when the fourth driving motor 82 rotates in the reverse direction.

That is, the fourth driving motor 82 and the third driving gear 83 constitute rotation driving means 15 of the present invention, and the rotation driving means 15 rotates the third driven gear 84.

The third driven gear 84 is substantially ring-shaped, and on the inner peripheral surface thereof, four fitting portions 84a having a recessed shape opened to the inside surface of the third driven gear 84 are provided at regular intervals around the rotation axis C2.

As shown in FIG. 17, the rotary disc 85 is provided with a disc-shaped upper disc 85a and lower disc 85b situated above and below the third driven gear 84, respectively.

The upper disc 85a has a disc shape, and in the center thereof, a circular upper tip passage hole 85c corresponding to the holding work space V1 is formed.

On the other hand, the lower disc 85b has a disc shape with a thickness, and is rotatably supported through the bearing Be inside of a lower half part of the third driven gear 84.

In the center of the lower disc 85b, the upper tip passage hole 85c and a lower tip passage hole 85d corresponding to the holding work space V1 are formed.

Between the upper disc 85*a* and the third driven gear 84, a plate spring 87 is disposed that increases the resistance value between the upper disc 85*a* and the third driven gear 84.

Inside of the third driven gear 84 and between the upper disc 85*a* and the lower disc 85*b*, as shown in FIGS. 20 and 21, four holding bodies 86 substantially arrow-shaped in plan view are disposed, and the holding bodies 86 are provided in positions corresponding to the fitting portions 84*a*, respectively.

Substantially in the center of each holding body 86, an insertion hole 86*a* is formed, and in each insertion hole 86*a*, a rotating shaft 86*b* is inserted that extends in the same direction as the rotation axis C2.

The end portions of each rotating shaft 86*b* are fixed to the upper disc 85*a* and the lower disc 85*b*, respectively, and the holding bodies 86 are supported by the rotary disc 85 so as to be rotatable about the rotating shaft 86*b*.

On the head end of each holding body 86, a pair of claw portions 86*c* are provided so as to project toward the first region R1, and the claw portions 86*c* are separated in a circumferential direction with the rotation axis C2 as the center.

On the other hand, in the center on the base end side of each holding body 86, a projecting base portion 86*d* is provided that projects to the opposite side of the holding work space V1, and each base portion 86*d* is loosely fitted in the corresponding fitting portion 84*a*.

Figure 33:
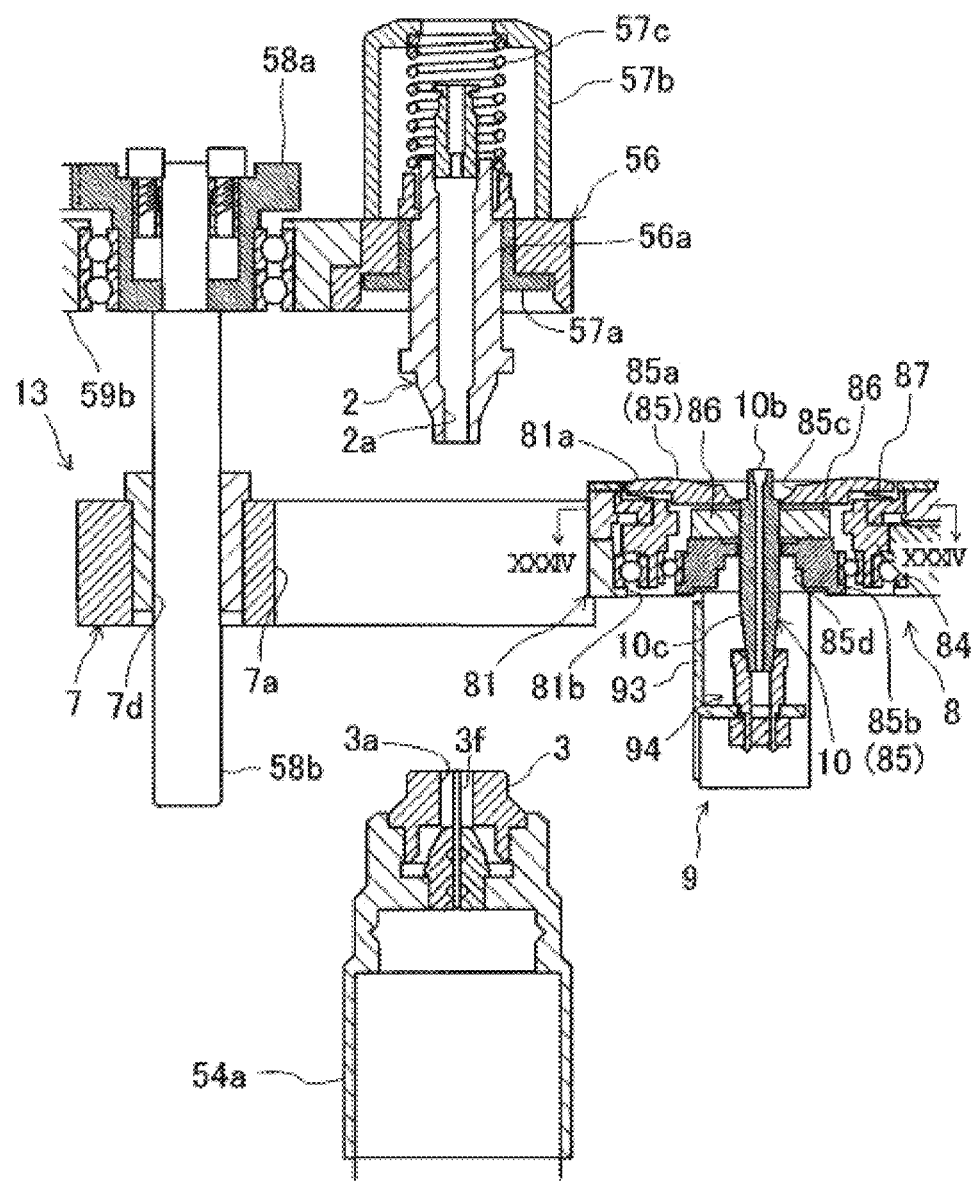
FIG. 33 is a view showing a condition immediately after the contact tip is held by the tip holding unit after FIG. 32.
Figure 34:
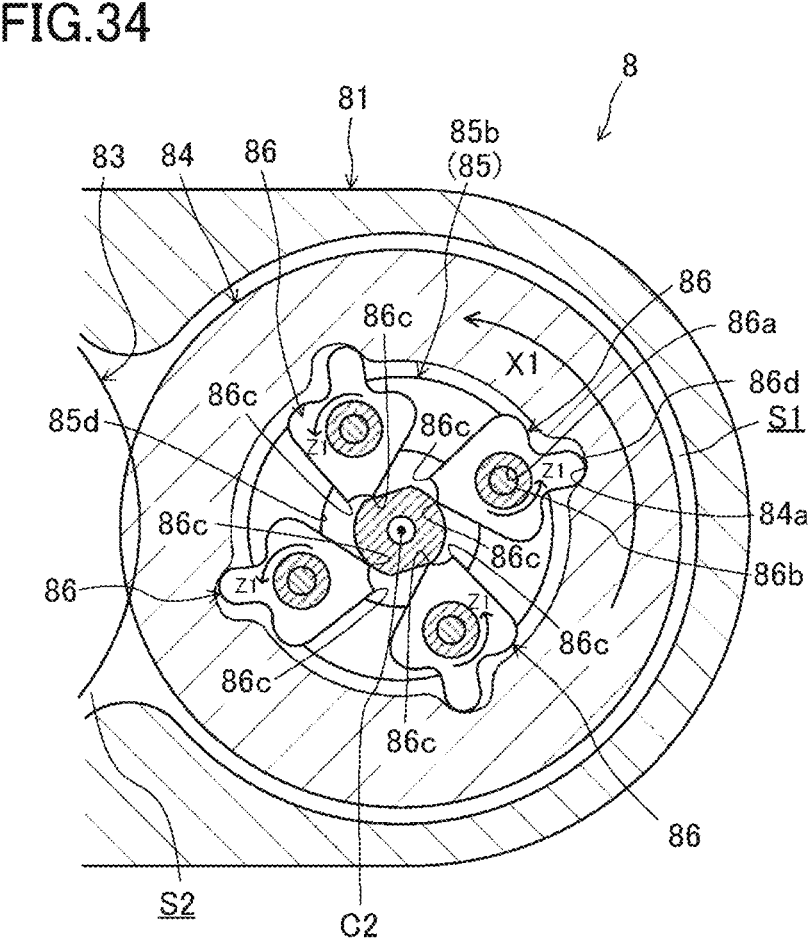
FIG. 34 is a cross-sectional view on line XXXIV-XXXIV of FIG. 33.

When the fourth driving motor 82 is rotated in the normal direction with the contact tip 10 being set in the holding work space V1 and the third driven gear 84 and the rotary disc 85 being in a reference position B1 as shown in FIG. 21, as shown in FIGS. 33 and 34, the third driven gear 84 rotates to one side (X1 direction) relatively to the rotary disc 85, and interlocking pressing of the base portion 86*d* to one side by each fitting portion 84*a* rotates the holding body 86 to one side (Z1 direction) to move one claw portion 86*c* forward to the holding work space V1, thereby holding the contact tip 10.

Figure 35:
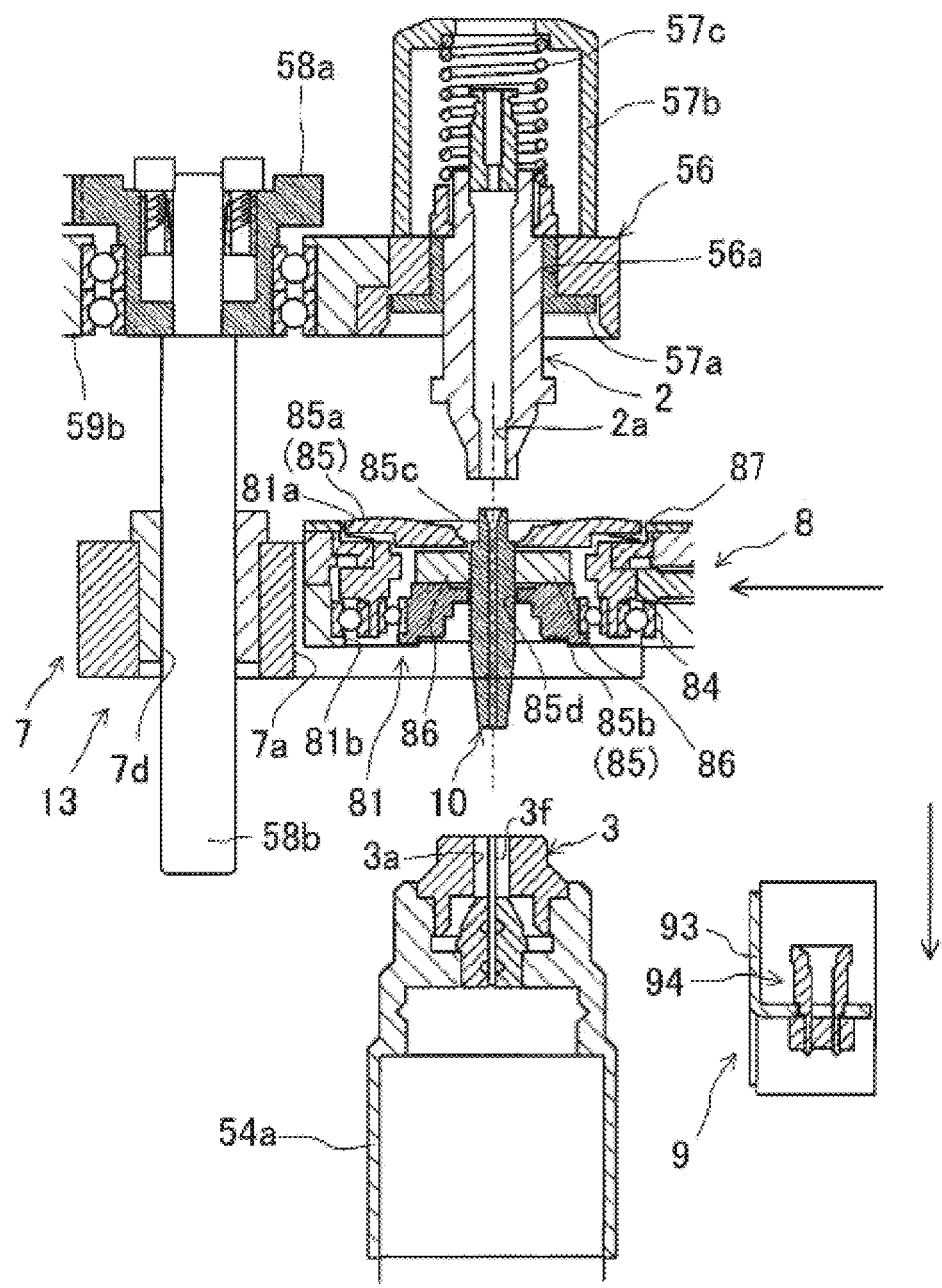
FIG. 35 is a view showing a condition immediately after the tip holding unit is moved to between the first and second dies after FIG. 33.
Figure 36:
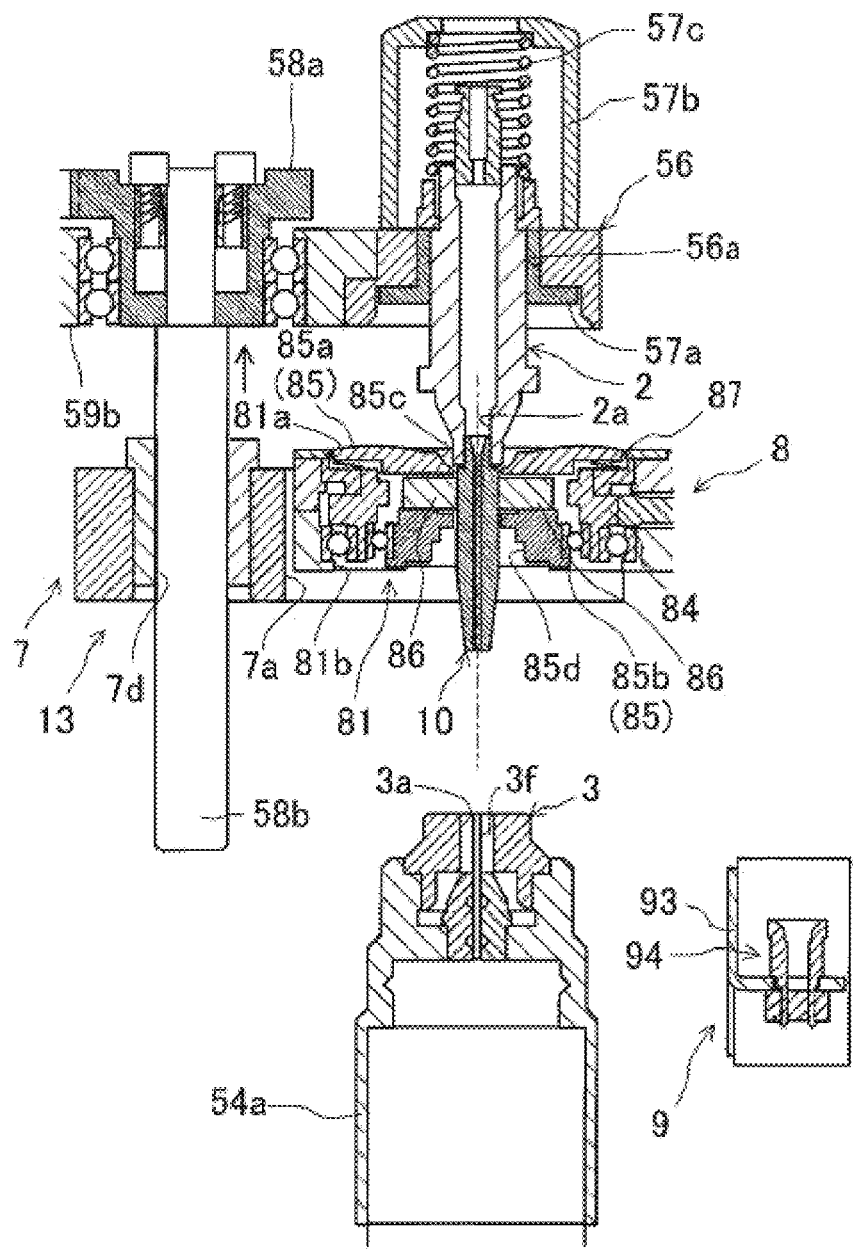
FIG. 36 is a view showing a condition immediately after the contact tip is fixed to the first die after FIG. 35.

Moreover, when the tip holding unit 8 is moved to the second region R2 with the contact tip 10 being held by one claw portion 86*c* of each holding body 86 and the tip holding unit 8 is moved upward while the fourth driving motor 82 is further rotated in the normal direction as shown in FIG. 35, as shown in FIG. 36, the male screw portion 10*b* of the contact tip 10 held by the tip holding unit 8 is screwed into the female screw portion 2*a* of the first die 2 to thereby fix the contact tip 10 to the first die 2.

Figure 37:
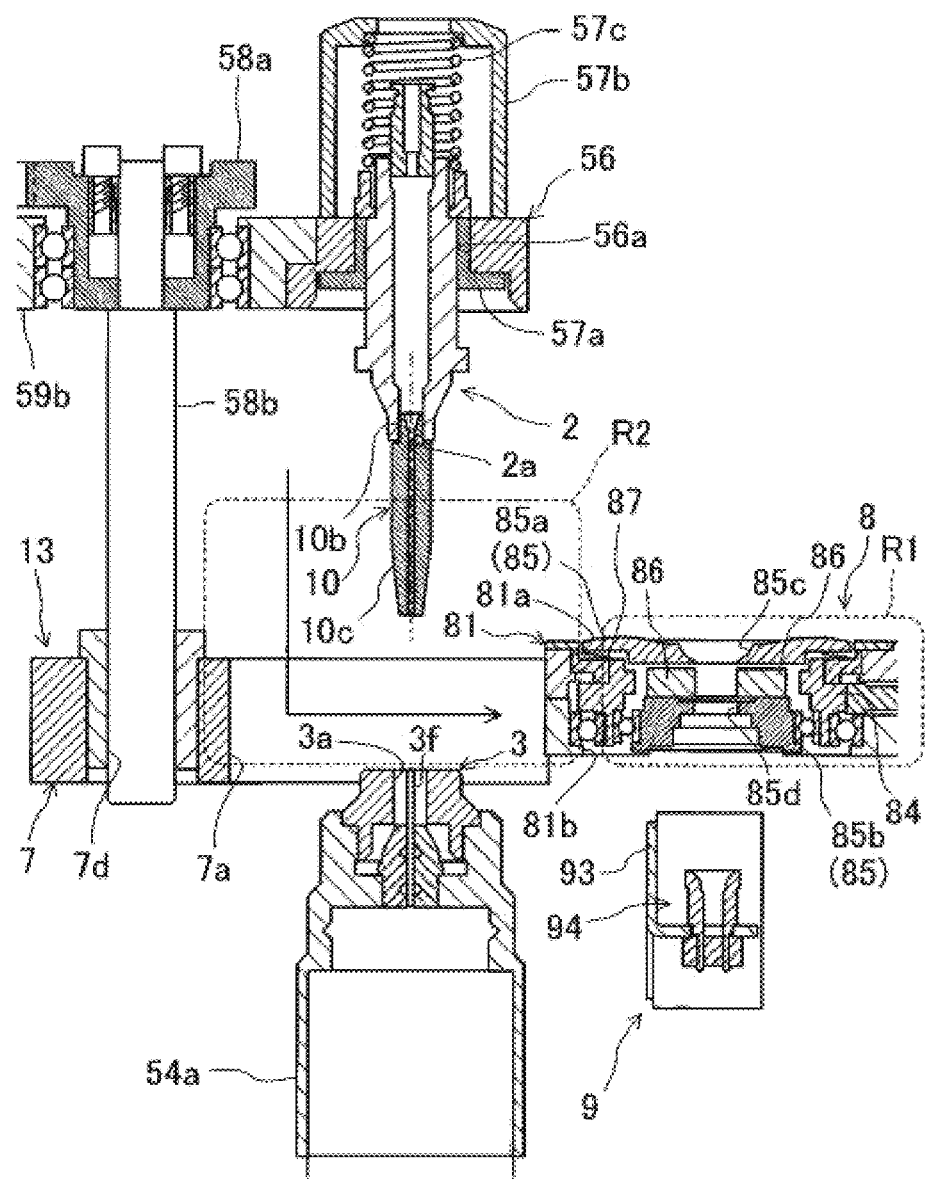
FIG. 37 is a view showing a condition where the tip holding unit is retreated from between the first and second dies after FIG. 36.

Further, when the fourth driving motor 82 is rotated in the reverse direction as shown in FIG. 37 after the contact tip 10 is fixed to the first die 2, the third driven gear 84 rotates to the other side (X2 direction) relatively to the rotary disc 85, and interlocking pressing of the base portion 86*d* to the other side by each fitting portion 84*a* rotates the holding body 86 to the other side (Z2 direction) to move one claw portion 86*c* backward from the holding work space V1, whereby the hold of the contact tip 10 is released.

Figure 39:
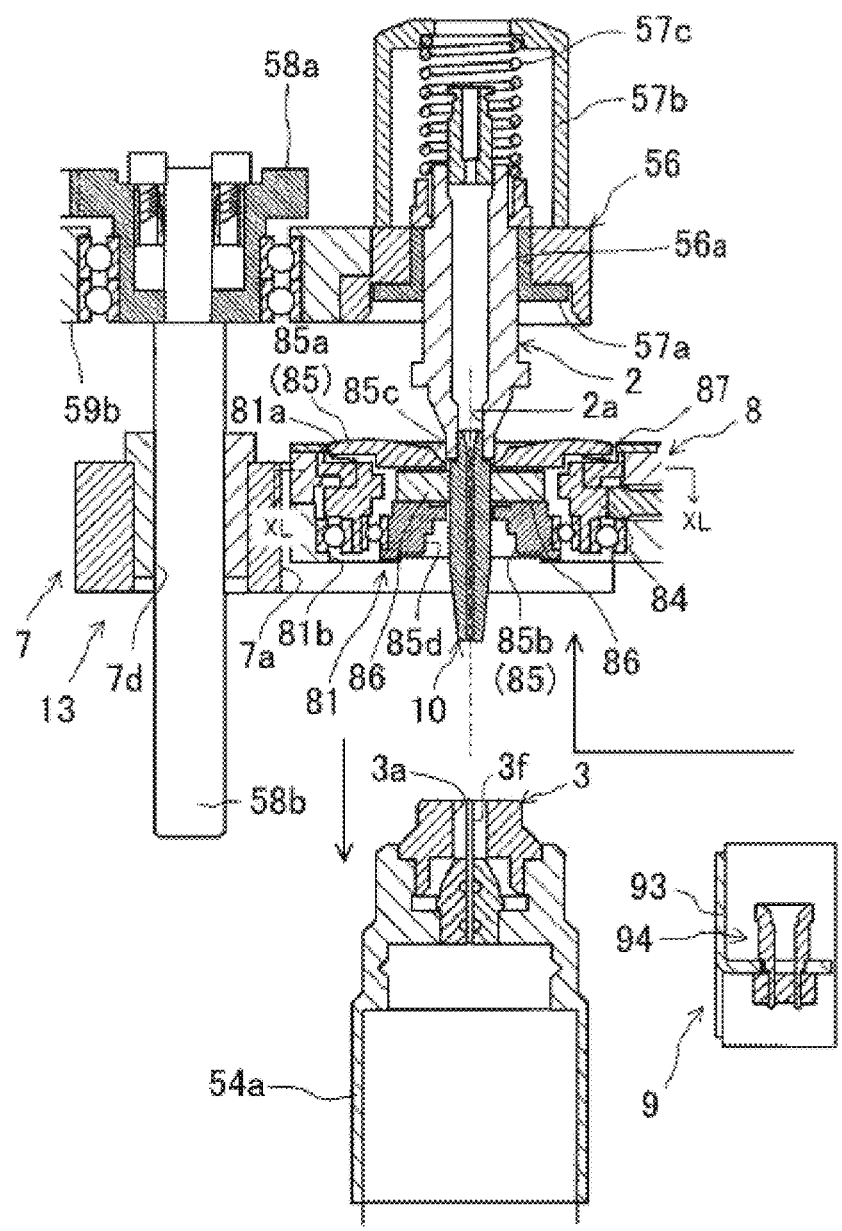
FIG. 39 is a view showing a condition in the middle of detachment of the contact tip from the first die after FIG. 38.
Figure 40:
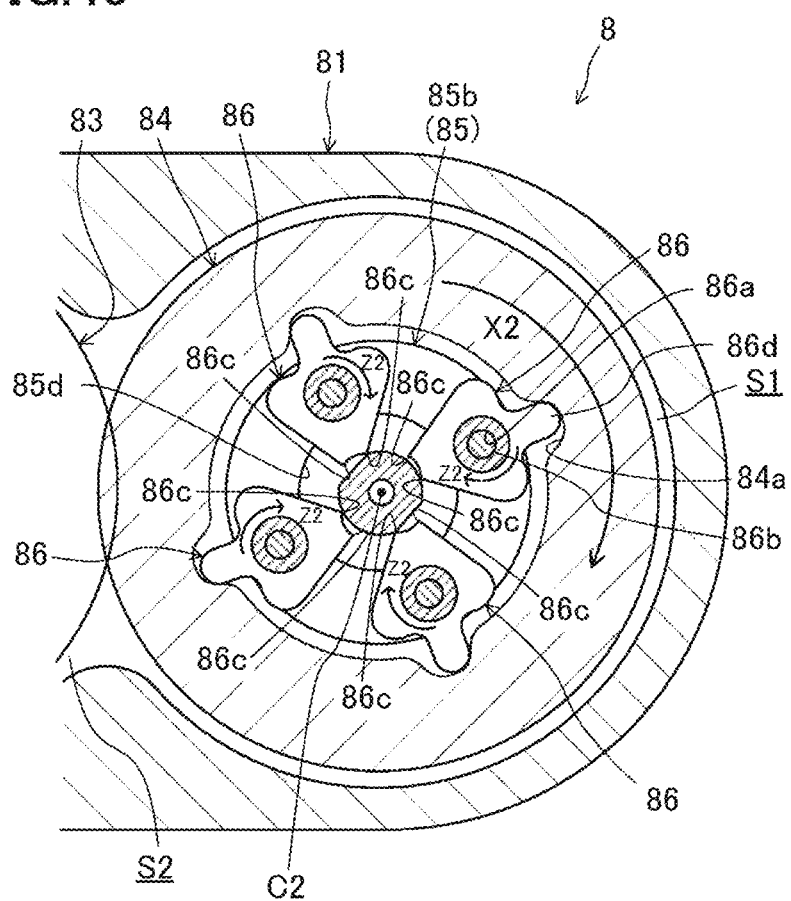
FIG. 40 is a cross-sectional view on line XL-XL of FIG. 39.

On the other hand, when the fourth driving motor 82 is rotated in the reverse direction with the contact tip 10 fixed to the first die 2 being set in the holding work space V1 and the third driven gear 84 and the rotary disc 85 being in the reference position B1 as shown in FIG. 39, as shown in FIG. 40, the third driven gear 84 rotates to the other side (X2 direction) relatively to the rotary disc 85, and interlocking pressing of the base portion 86*d* to the other side by each fitting portion 84*a* rotates the holding body 86 to the other side to move the other claw portion 86*c* forward to the holding work space V1, whereby the contact tip 10 is held.

Figure 41:
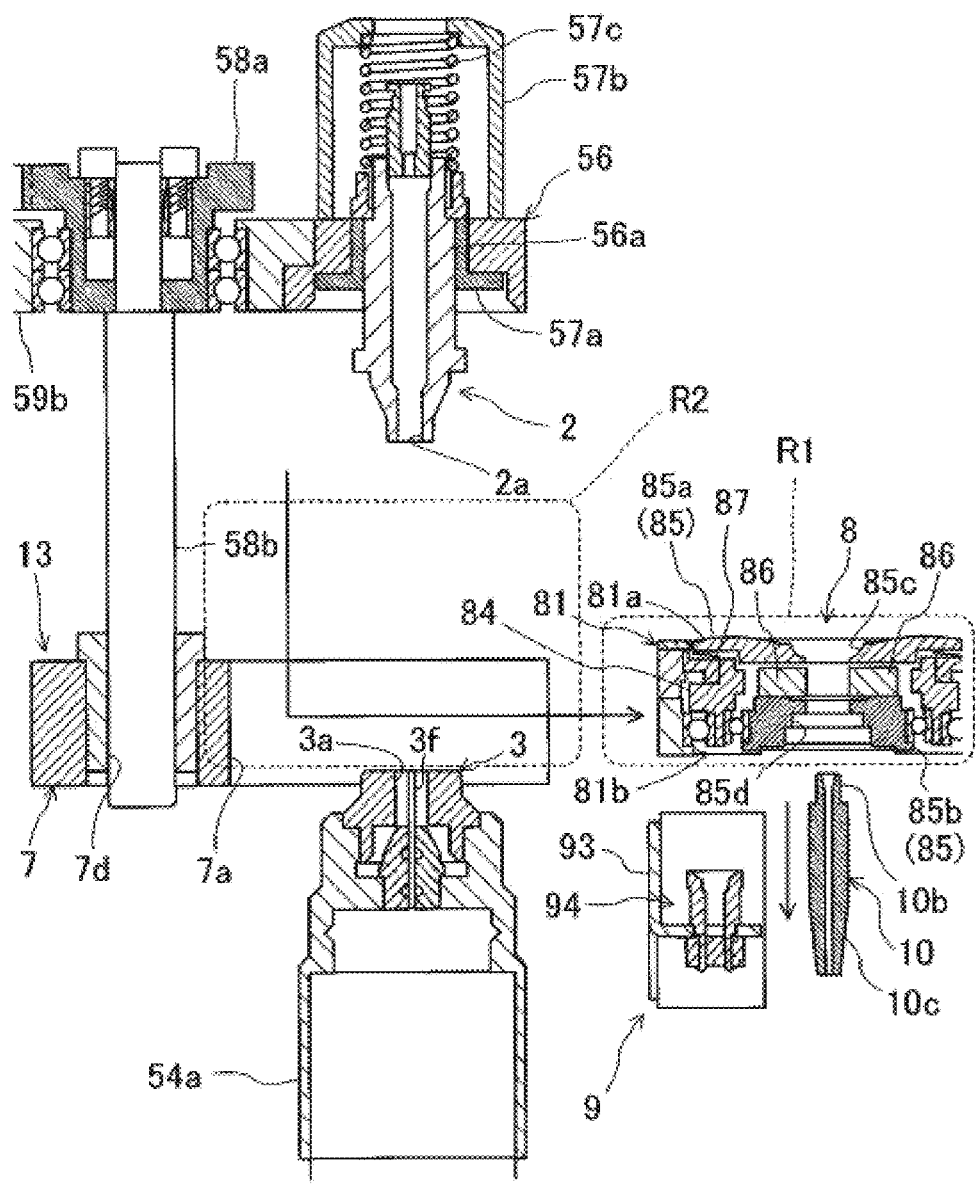
FIG. 41 is a view showing a condition where the reformed contact tip is discharged after FIG. 39.

Moreover, when the fourth driving motor 82 is further rotated in the reverse direction with the contact tip 10 being held by the other claw portion 86*c* of each holding body 86 as shown in FIG. 41, the male screw portion 10*b* of the contact tip 10 held by the tip holding unit 8 is screwed out from the female screw portion 2*a* of the first die 2, whereby the contact tip 10 is detached from the first die 2.

Further, when, after the contact tip 10 is detached from the first die 2, the tip holding unit 8 is moved to the first region R1 with the contact tip 10 being held by the other claw portion 86*c* of each holding body 86 and the fourth driving motor 82 is rotated in the normal direction, the third driven gear 84 rotates to one side (X1 direction) relatively to the rotary disc 85, and interlocking pressing of the base portion 86*d* to one side by each fitting portion 84*a* rotates the holding body 86 to one side to cause the other claw portion 86*c* to retreat to the holding work space V1, whereby the contact tip 10 is dropped from the holding work space V1.

On the device back side of the piston rod 54*a* on the upper surface of the upper base plate 51, a discharge slope 16 is provided that guides, to the device back side, the reformed contact tip 10 dropped from the first region R1.

Next, the reforming of the contact tip 10 by the contact tip reforming device 1 of the second embodiment will be described in detail.

First, with a plurality of used contact tips 10 being put inside the hopper 61 as shown in FIG. 14, the worker operates the operation panel 1*b* to start the contact tip reforming device 1. Then, the second driving motor 63 is started to rotate the hopper 61, so that the contact tips 10 accumulated inside the hopper 61 are sent out one by one from the lower end of the hopper 61 to the tip orientation aligning unit 65. At this time, the contact tips 10 sent out to the tip orientation aligning unit 65 are in a state where the central axes of the contact tips 10 face obliquely downward although it is unknown whether the head end sides face downward or the base end sides face downward.

When the head end side of the contact tip 10 sent out to the tip orientation aligning unit 65 face downward, as shown in FIG. 24, the contact tip 10 is guided obliquely downward on one side half of the inclined surface portion 67*d* of the tip guide mechanism 67 and the head end of the contact tip 10 is in contact with the first stopper portion 67*e*, so that the contact tip 10 is temporarily stopped.

When the head end of the contact tip 10 is in contact with the first stopper portion 67*e*, the electric cylinder 67*c* is started to slide the upper frame 67*b* to one side in the horizontal direction. Then, as shown in FIG. 25, since the first pressing wall portion 67*m* moves the contact tip 10 to one side in the horizontal direction until it is in contact with the first guide wall portion 67*f*, contact of the contact tip 10 with the first stopper portion 67*e* is released, and the contact tip 10 is guided obliquely downward by the other side half of the inclined surface portion 67*d*.

The contact tip 10 guided obliquely downward on the other side half of the inclined surface portion 67*d* enters between the second guide wall portion 67*n* and the second pressing wall portion 67*p*. At this time, since the contact tip 10 is in a state where the head end side thereof faces downward, the head end of the contact tip 10 is in contact with the first plate portion 67*q* of the second stopper portion 67*h* to stop the contact tip 10 from being further guided obliquely downward.

When the head end of the contact tip 10 is in contact with the second stopper portion 67*h*, the electric cylinder 67*c* is started to slide the upper frame 67*b* to the other side in the horizontal direction. Then, as shown in FIG. 26, the second pressing wall portion 67*p* moves the contact tip 10 to the other side in the horizontal direction. At this time, although the contact tip 10 drops into the guide hole portion 66*b*, since the body portion 10*c* of the contact tip 10 starts to drop into the guide hole portion 66*b* with the male screw portion 10*b* of the contact tip 10 running on the upper edge portion of the upper end opening of the guide hole portion 66*b*, as shown in FIG. 27, the contact tip 10 drops while the head end side thereof is rotating downward about the male screw portion 10*b*. Consequently, when passing the lower end opening of the guide hole portion 66*b*, the contact tip 10 always passes with the head end side facing downward and the center line extending in the vertical direction.

On the other hand, when the base end side of the contact tip 10 sent out from the hopper 61 to the tip orientation aligning unit 65 faces downward, as shown in FIG. 28, the contact tip 10 is guided obliquely downward on the one side half of the inclined surface portion 67*d* of the tip guide mechanism 67 and the base end of the contact tip 10 is in contact with the first stopper portion 67*e*, so that the contact tip 10 is temporarily stopped.

When the base end of the contact tip 10 is in contact with the first stopper portion 67*e*, the electric cylinder 67*c* is started to slide the upper frame 67*b* to one side in the horizontal direction. Then, as shown in FIG. 29, since the first pressing wall portion 67*m* moves the contact tip 10 to one side in the horizontal direction until it is in contact with the first guide wall portion 67*f*, contact of the contact tip 10 with the first stopper portion 67*e* is released, and the contact tip 10 is guided obliquely downward by the other side half of the inclined surface portion 67*d*.

The contact tip 10 guided obliquely downward on the other side half of the inclined surface portion 67*d* enters between the second guide wall portion 67*n* and the second pressing wall portion 67*p*. At this time, since the contact tip 10 is in a state where the base end side thereof faces downward, the male screw portion 10*b* of the contact tip 10 runs on the first plate portion 67*q* of the second stopper portion 67*h* and the body portion 10*c* of the contact tip 10 is in contact with the first plate portion 67*q* to stop the contact tip 10 from being further guided obliquely downward.

When the body portion 10*c* of the contact tip 10 is in contact with the first plate portion 67*q* of the second stopper portion 67*h*, the electric cylinder 67*c* is started to slide the upper frame 67*b* to the other side in the horizontal direction. Then, as shown in FIG. 30, the second pressing wall portion 67*p* moves the contact tip 10 to the other side in the horizontal direction. At this time, although the contact tip 10 drops into the guide hole portion 66*b*, since the body portion 10*c* of the contact tip 10 starts to drop into the guide hole portion 66*b* with the male screw portion 10*b* running on the first plate portion 67*q* of the second stopper portion 67*h*, as shown in FIG. 31, the contact tip 10 drops while the head end side thereof is rotating downward about the male screw portion 10*b*. Consequently, when passing the lower end opening of the guide hole portion 66*b*, the contact tip 10 always passes with the head end side facing downward and the center line extending in the vertical direction. As described above, even when the orientations of the head ends of the contact tips 10 supplied to the inclined surface portion 67*d* are different, the orientations of the head ends of the contact tips 10 supplied to the first region R1 can be made always the same.

Figure 32:
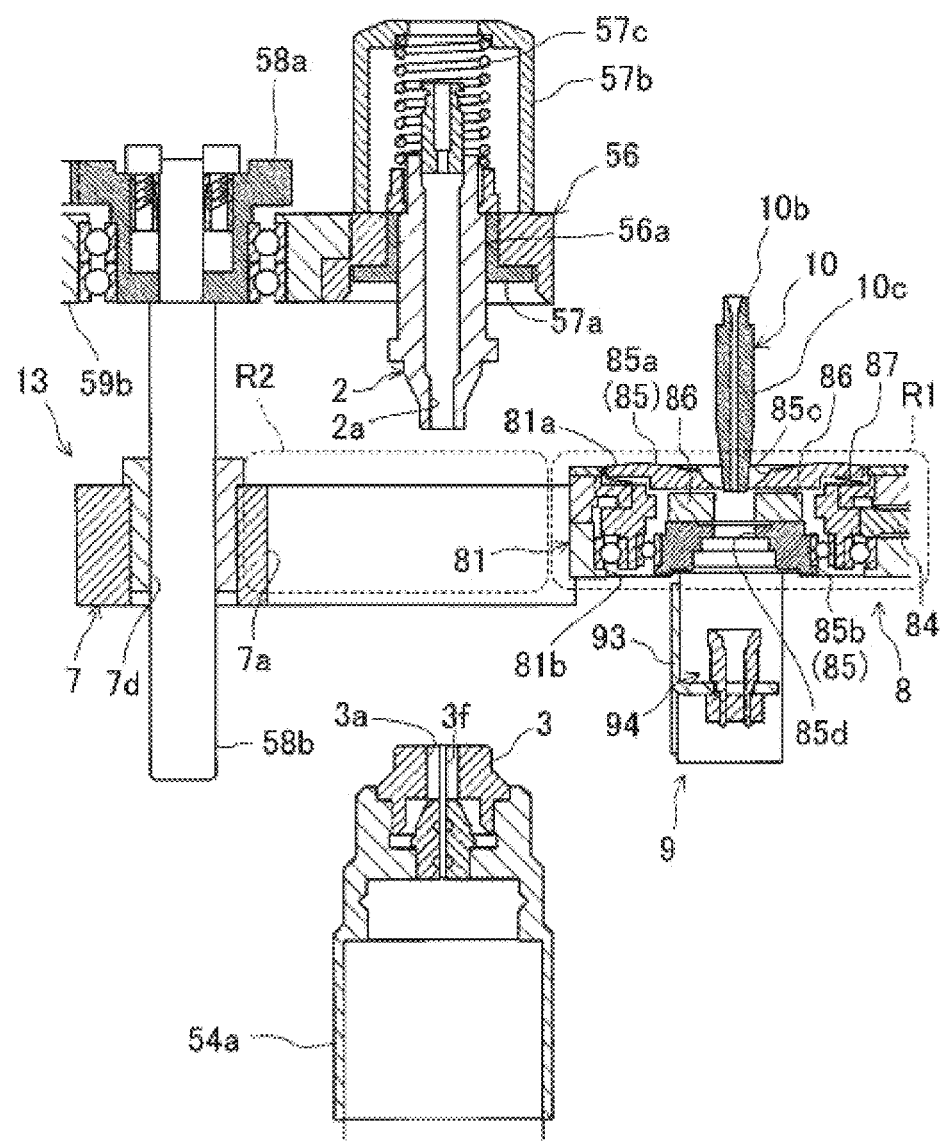
FIG. 32 is a cross-sectional view on line A-A of FIG. 12 and is a view showing a condition immediately before the contact tip is supplied to the tip holding unit.

As shown in FIGS. 32 and 33, after passing the guide cylinder 66*c*, the contact tip 10 passing the lower end opening of the guide hole portion 66*b* of the block body 66 enters the upper tip passage hole 85*c* of the upper disc 85*a*, the holding work space V1 and the lower tip passage hole 85*d* of the lower disc 85*b* in this order, and the head end side of the contact tip 10 enters the upper end opening of the tip support member 94 of the tip positioning unit 9. Then, the contact tip 10 is positioned with the central axis thereof extending in the vertical direction and the body portion 10*c* being situated in the holding work space V1.

When the contact tip 10 is positioned by the tip positioning unit 9, the fourth driving motor 82 is started to rotate the rotary shaft 82*a* in the normal direction, and accordingly, the third driven gear 84 rotates to one side (X1 direction) relatively to the rotary disc 85. Then, as shown in FIG. 34, the fitting portion 84*a* presses the base portion 86*d* to one side in conjunction with the rotation of the third driven gear 84 to one side relative to the rotary disc 85, and the pressing rotates each holding body 86 to one side (Z1 direction) to move one claw portion 86*c* forward to the holding work space V1, thereby holding the contact tip 10.

When one claw portion 86*c* of each holding body 86 holds the contact tip 10, as shown in FIG. 35, the sliders 92 of the tip positioning unit 9 slide downward to detach the tip support member 94 from the head end of the contact tip 10.

Then, when the tip support member 94 is detached from the head end of the contact tip 10, the third driving motor 7*k* is started to horizontally move the tip holding unit 8 from the first region R1 to the second region R2.

When the central axis of the contact tip 10 held by the tip holding unit 8 having horizontally moved to the second region R2 coincides with the cylinder center line of the first die 2, the first driving motor 59 and the fourth driving motor 82 are started to move the tip holding unit 8 upward while the contact tip 10 held by one claw portion 86*c* of each holding body 86 is rotating to one side, and as shown in FIG. 36, the male screw portion 10*b* of the contact tip 10 screws into the female screw portion 2*a* of the first die 2 while the impact when the contact tip 10 comes into contact with the first die 2 is absorbed by the coil spring 57*c* contracting, whereby the contact tip 10 is fixed to the first die 2.

When the contact tip 10 is fixed to the first die 2, the fourth driving motor 82 is started to rotate the rotary shaft 82*a* in the reverse direction, and accordingly, the third driven gear 84 rotates to the other side (X2 direction) relatively to the rotary disc 85. Then, the fitting portion 84*a* presses the base portion 86*d* to the other side in conjunction with the rotation of the third driven gear 84 to the other side relative to the rotary disc 85, and the pressing rotates the holding body 86 to the other side (Z2 direction) to cause one claw portion 86*c* to retreat from the holding work space V1, thereby releasing the hold of the contact tip 10.

When the hold of the contact tip 10 by the tip holding unit 8 is released, as shown in FIG. 37, the first driving motor 59 and the third driving motor 7*k* are started to horizontally move the tip holding unit 8 from the second region R2 to the first region R1 while moving downward.

Figure 38:
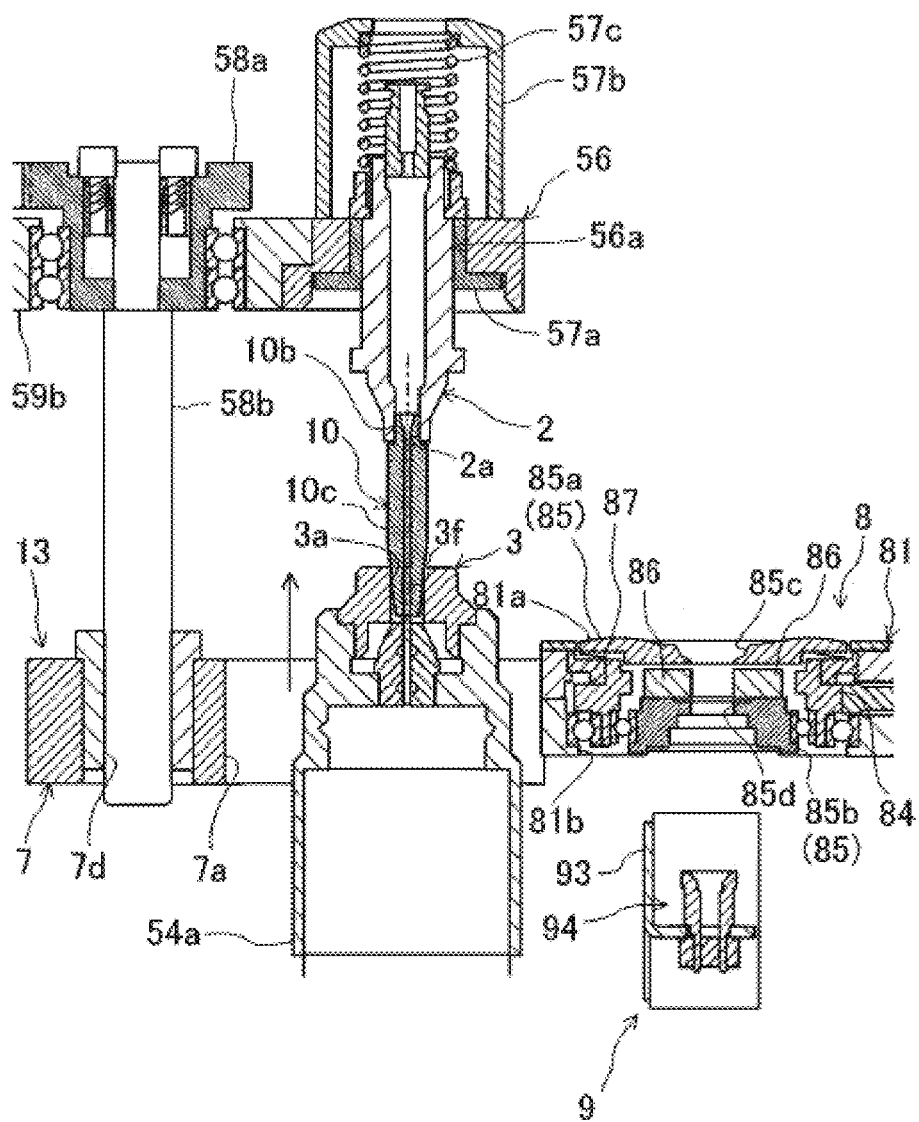
FIG. 38 is a view showing a condition in the middle of reforming of the contact tip after FIG. 37.

Thereafter, as shown in FIG. 38, the piston rod 54*a* of the fluid pressure cylinder 54 is extended to move the second die 3 upward. Then, the second die 3 approaches the first die 2 to insert the core metal 3*f* into the guide hole 10*a* of the used contact tip 10 and the head end side of the contact tip 10 enters the plastic processing hole 3*a* to be reformed.

Thereafter, as shown in FIG. 39, the piston rod 54*a* of the fluid pressure cylinder 54 contracts to move the first die 2 downward. Then, the first driving motor 59 and the third driving motor 7k are started, so that the tip holding unit 8 is horizontally moved from the first region R1 to the second region R2 and is moved upward to cause the contact tip 10 fixed to the first die 2 to enter the upper tip passage hole 85c of the upper disc 85a, the holding work space V1 and the lower tip passage hole 85d of the lower disc 85b in this order.

When the body portion 10c of the contact tip 10 is situated in the holding work space V1, the fourth driving motor 82 is started to rotate the rotary shaft 82a in the reverse direction, and accordingly, the third driven gear 84 rotates to the other side (X2 direction) relatively to the rotary disc 85. Then, as shown in FIG. 40, the fitting portion 84a presses the base portion 86d to the other side in conjunction with the rotation of the third driven gear 84 to the other side relative to the rotary disc 85, and the pressing rotates each holding body 86 to the other side (Z2 direction) to move the other claw portion 86c forward to the holding work space V1, thereby holding the contact tip 10.

When the other claw portion 86c of each holding body 86 holds the contact tip 10, the fourth driving motor 82 is started to further rotate the rotary shaft 82a in the reverse direction, and accordingly, the contact tip 10 rotates to the other side. Then, the male screw portion 10b of the contact tip 10 screws out from the female screw portion 2a of the first die 2 to detach the contact tip 10 from the first die 2.

When the contact tip 10 is detached from the first die 2, as shown in FIG. 41, the first driving motor 59 and the third driving motor 7k are started to horizontally move the tip holding unit 8 from the second region R2 to the first region R1 while moving downward. Then, when the tip holding unit 8 reaches the first region R1, the fourth driving motor 82 is started to rotate the rotary shaft 82a in the normal direction, and accordingly, the third driven gear 84 rotates to one side (X1 direction) relatively to the rotary disc 85. Then, the fitting portion 84a presses the base portion 86d to one side in conjunction with the rotation of the third driven gear 84 to one side relative to the rotary disc 85, and the pressing rotates the holding body 86 to one side (Z1 direction) to cause the other claw portion 86c to retreat from the holding work space V1, thereby releasing the hold of the contact tip 10. Then, the contact tip 10 having released from being held by the other claw portion 86c of each holding body 86 drops downward, and is guided by the discharge slope 16 to be discharged to a non-illustrated discharge region.

As described above, according to the second embodiment of the present invention, the contact tip 10 supplied to the first region R1 by the tip supply unit 6 is held by the tip holding unit 8 with the center line thereof extending vertically, and is conveyed to the second region R2 by the horizontally moving means 14 under that condition. Since the contact tip 10 conveyed to the second region R2 is conveyable to the first die 2 by the moving upward and downward means 13 in the second region R2, when the conveyed contact tip 10 is fixed to the first die 2, the contact tip 10 is in a reform standby state. As described above, the unreformed contact tip 10 can be efficiently brought into the reform standby state. Moreover, when the tip holding unit 8 is moved to the first die 2 to which the reformed contact tip 10 is fixed, by the moving upward and downward means 13 and the horizontally moving means 14 and then, the tip holding unit 8 is retreated from the first die 2 and the second die 3 by the moving upward and downward means 13 and the horizontally moving means 14, the reformed contact tip 10 can be easily taken out from the second region R2. As described above, the unreformed and reformed contact tips 10 can be efficiently conveyed to and from the second region R2 where the contact tips 10 are reformed.

Moreover, when the contact tip 10 is set in the holding work space V1 with the third driven gear 84 and the rotary disc 85 being in the reference position B1 and then, the third driven gear 84 and the rotary disc 85 are rotated to one side relatively to each other, one claw portion 86c of each holding body 86 moves forward to the holding work space V1 to hold the contact tip 10 and cause the third driven gear 84 and the rotary disc 85 to integrally rotate to one side about the center line thereof, whereas when the contact tip 10 is set in the holding work space V1 with the third driven gear 84 and the rotary disc 85 being in the reference position B1 and then, the third driven gear 84 and the rotary disc 85 are rotated to the other side relatively to each other, the other claw portion 86c of each holding body 86 moves forward to the holding work space V1 to hold the contact tip 10 and cause the third driven gear 84 and the rotary disc 85 to integrally rotate to the other side about the center line thereof. As described above, the contact tip 10 can be held irrespective of the direction in which the third driven gear 84 and the rotary disc 85 are rotated relatively to each other, and the contact tip 10 can be rotated about the center line thereof in a state of being held.

Further, when the contact tip 10 is caused to approach the first die 2 by moving the moving upward and downward means 13 upward and downward while the third driven gear 84 and the rotary disc 85 are rotated from the reference position B1 to one side relatively to each other to hold the contact tip 10 by one claw portion 86c of each holding body 86 and rotate it to one side about the center line thereof, the male screw portion 10b of the contact tip 10 screws into the female screw portion 2a of the first die 2, so that the contact tip 10 is fixed to the first die 2. When the third driven gear 84 and the rotary disc 85 are rotated to the other side relatively to each other after the contact tip 10 is fixed to the first die 2, one claw portion 86c of each holding body 86 retreats from the holding work space V1, so that the tip holding unit 8 releases the contact tip 10. On the other hand, when the contact tip 10 fixed to the first die 2 is separated from the first die 2 by moving the moving upward and downward means 13 upward and downward while the third driven gear 84 and the rotary disc 85 are rotated from the reference position B1 to the other side relatively to each other to hold the contact tip 10 by the other claw portion 86c of each holding body 86 and rotate it to the other side about the center line thereof, the male screw portion 10b of the contact tip 10 screws out from the female screw portion 2a of the first die 2, so that the contact tip 10 is detached from the first die 2. As described above, the rotations of the third driven gear 84 and the rotary disc 85 enable the hold and release of the contact tip 10 and further, fixing and detachment to and from the first die 2, so that the procedures before and after reforming of the contact tip 10 can be efficiently performed.

While the third driven gear 84 is rotated relatively to the rotary disc 85 to hold the contact tip 10 by the holding bodies 86 in the second embodiment of the present invention, the rotary disc 85 may be rotated relatively to the third driven gear 84 to hold the contact tip 10 by the holding bodies 86 or both the third driven gear 84 and the rotary disc 85 may be relatively rotated at the same time to hold the contact tip 10 by the holding bodies 86.

The present invention is suitable for a contact tip reforming device and a contact tip reforming method for reforming a contact tip in a state where the head end side inner peripheral surface of the guide hole that guides the welding wire is worn after arc welding is repetitively performed.

DESCRIPTION OF REFERENCE CHARACTERS

1 Contact tip reforming device
2 First die
3 Second die
3a Plastic processing hole
3b Projecting portion
3e Recessed surface portion
3f Core metal
4 Pressing machine
6 Tip supply unit (tip supply means)
8 Tip holding unit (tip holding means)
10 Contact tip
10a Guide hole
13 Moving upward and downward means
14 Horizontally moving means
15 Rotation driving means
66b Guide hole portion
67d Inclined surface portion
67h Second stopper portion
84 Third driven gear (first rotating body)
84a Fitting portion
85 Rotary disc (second rotating body)
86 Holding body
86b Rotating shaft
86c Claw portion
86d Base portion
C1 Hole center line
R1 First region
R2 Second region

What is claimed is:

1. A contact tip reforming device that reforms a contact tip for arc welding where a head end side inner peripheral surface of a guide hole that guides a welding wire is worn because of use, the device comprising:
a first die to which the contact tip is fixable;
a second die disposed so as to face a head end side of the contact tip fixed to the first die; and
a pressing machine that causes the first and second dies to approach each other and separate from each other;
wherein the second die is provided with: a processing hole formed in a position corresponding to the contact tip fixed to the first die, and the processing hole has a shape that gradually decreases in diameter with increasing distance from the first die, and the processing hole is structured to plastically deform the inserted head end side of the contact tip; and a core metal fixed to a hole center line of the processing hole, wherein the core metal has a circular shape and a cross section that conforms to a cross section of the guide hole, and the core metal is inserted from the head end side of the contact tip into the guide hole of the contact tip fixed to the first die when the first and second dies are approaching each other;
wherein the processing hole has an inner peripheral surface on which the following are provided: at least three projecting portions integrally formed on the inner peripheral surface of the processing hole that projects inward of the processing hole, wherein the projecting portions extend along the hole center line and are situated at regular intervals in a circumferential direction of the hole center line; and recessed surface portions that are as many as the projecting portions, wherein the recessed surface portions are each formed by a space between adjoining two projecting portions and are situated at regular intervals in the circumferential direction of the hole center line; and
wherein the projecting portions are structured to plastically deform the head end side of the contact tip, when the contact tip is inserted into the processing hole by the approach of the first and second dies to each other by the processing machine, and wherein the head end side of the contact tip is pressed toward the hole center line until the head end side of the contact tip is in contact with the core metal inserted from the head end side of the contact tip while the projecting portions are in sliding contact with a head end side outer peripheral surface of the contact tip under a condition where the contact tip is out of contact with the recessed surface portions.

2. The contact tip reforming device according to claim 1, further comprising
a contact tip insertion opening side of the processing hole and a guide surface;
wherein on the contact tip insertion opening side of the processing hole on each of the projecting portions, the guide surface is formed that inclines so that the distance from the hole center line gradually increases toward a circumferential edge of a contact tip insertion opening.

3. The contact tip reforming device according to claim 1, wherein the projecting portions are provided three in number in the circumferential direction of the hole center line.

4. The contact tip reforming device according to claim 1, comprising:
tip supply means for supplying the contact tip to a first region with a center line of the first region being oriented vertically;
tip holding means capable of holding the contact tip;
horizontally moving means for horizontally moving the tip holding means between the first region and a second region that is set on a side of the first region and between the first and second dies; and
moving upward and downward means for moving the tip holding means upward and downward in the second region.

5. The contact tip reforming device according to claim 4, wherein the tip holding means is provided with a first rotating body having a holding work space where a rotation axis is set at a center and having a plurality of fitting portions at regular intervals around the rotation axis;
a second rotating body structured so as to be rotatable about the rotation axis relatively to the first rotating body;
rotation driving means for rotating at least one of the first and second rotating bodies; and
holding bodies disposed in positions corresponding to the fitting portions, respectively, supported by the second rotating body so as to be rotatable about the rotating shaft extending in the same direction as the rotation axis, each of the holding bodies having a pair of claw portions formed at a head end so as to be separated in a circumferential direction with the rotating shaft as the center, and base ends of the holding bodies are loosely fitted in the corresponding fitting portions;
when the first and second rotating bodies rotate from a reference position to one side relatively to each other by a driving operation of the rotation driving means, the holding bodies are each rotated to the one side by pressing of the base portion to the one side by the fitting portion and one of the claw portions moves forward to the holding work space so as to be contactable with the contact tip that is set in the holding work space, thereby holding the contact tip; and when the first and second rotating bodies rotate from the reference position to the other side relatively to each other, the holding bodies are each rotated to the other side by pressing of the base portion to the other side by the fitting portion and the other of the claw portions moves forward to the holding work space so as to be contactable with the contact tip that is set in the holding work space, thereby holding the contact tip.

6. The contact tip reforming device according to claim 5, wherein the first die has a female screw portion corresponding to a male screw portion formed on a base end side of the contact tip, the contact tip is rotated to one side about a center line of the contact tip to thereby screw the male screw portion into the female screw portion to fix the contact tip to the first die, and the contact tip is rotated to the other side about the center line thereof to thereby screw the male screw portion out from the female screw portion to detach the contact tip from the first die.

7. The contact tip reforming device according to claim 6, wherein the tip supply means is provided with an inclined surface portion that guides the contact tip obliquely downward under the contact tip's own weight in a state where the center line of the contact tip extends obliquely downward;

further comprising a guide hole portion provided on a side on a downstream side of the inclined surface portion, having at an upper end an upper end opening whose dimension in an extension direction of the inclined surface portion corresponds to a dimension in a length direction of a body portion of the contact tip excluding the male screw portion, and having at a lower end an opening of a dimension corresponding to a width dimension of the contact tip; and a stopper portion provided at a downstream end of the inclined surface, having a shape with a portion extending in a horizontal direction orthogonal to the extension direction of the inclined surface portion and toward the guide hole portion that is at a position continuous with a lower part of a lower edge portion of the upper end opening of the guide hole portion, and being set in a shape that is in contact with the head end of the contact tip when the contact tip is guided by the inclined surface portion so that the head end side of the contact tip faces downward and is in contact with the body portion without being in contact with the male screw portion when the contact tip is guided by the inclined surface portion so that the base end side of the contact tip faces downward.

\* \* \* \* \*